US011453518B2

(12) United States Patent
Lazzara et al.

(10) Patent No.: US 11,453,518 B2
(45) Date of Patent: *Sep. 27, 2022

(54) COMPOSITE REINFORCEMENT SYSTEMS AND METHODS OF MANUFACTURING THE SAME

(71) Applicant: CSC OPERATING COMPANY, LLC, Houston, TX (US)

(72) Inventors: Christopher J. Lazzara, Palm Beach, FL (US); Richard J. Lazzara, Palm Beach, FL (US); Venkatachala S. Minnikanti, Delray Beach, FL (US); Christopher R. Fenoli, Riviera Beach, FL (US); Davie Peguero, Lake Park, FL (US)

(73) Assignee: CSC OPERATING COMPANY, LLC, Houston, TX (US)

( * ) Notice: Subject to any disclaimer, the term of this patent is extended or adjusted under 35 U.S.C. 154(b) by 173 days.

This patent is subject to a terminal disclaimer.

(21) Appl. No.: 16/794,818

(22) Filed: Feb. 19, 2020

(65) Prior Publication Data

US 2020/0180801 A1    Jun. 11, 2020

Related U.S. Application Data

(62) Division of application No. 15/001,977, filed on Jan. 20, 2016, now Pat. No. 10,597,182.

(Continued)

(51) Int. Cl.
*B29C 73/10* (2006.01)
*B65B 31/00* (2006.01)
(Continued)

(52) U.S. Cl.
CPC ............ *B65B 31/006* (2013.01); *B29C 73/10* (2013.01); *F16L 55/1686* (2013.01);
(Continued)

(58) Field of Classification Search
CPC .... B65B 31/006; B29C 73/10; F16L 55/1686; B29K 2075/00
(Continued)

(56) References Cited

U.S. PATENT DOCUMENTS 4,086,378 A    4/1978  Kam
4,519,856 A    5/1985  Lazzara
(Continued)

FOREIGN PATENT DOCUMENTS

EP    0507220    10/1992
EP    1028095    8/2000
(Continued)

OTHER PUBLICATIONS

Office Action issued in corresponding Russian Patent Application No. 2017123760, 8 pages, dated Jul. 16, 2019.
(Continued)

*Primary Examiner* — Matthew D Matzek
(74) *Attorney, Agent, or Firm* — Duane Morris LLP

(57) ABSTRACT

Systems and methods for reinforcing physical structures with composite reinforcement systems are disclosed herein. According to aspects of the present disclosure, a composite reinforcement system includes a carrier formed of a plurality of fibers and a blend of at least two reagents impregnated within the carrier. The at least two reagents are chemically configured to react to form a moisture-curable prepolymer. One reagent of the at least two reagents is an isocyanate, and another reagent of the at least two reagents is an aromatic-group-containing polyol.

16 Claims, 11 Drawing Sheets

Related U.S. Application Data

(60) Provisional application No. 62/195,560, filed on Jul. 22, 2015, provisional application No. 62/106,629, filed on Jan. 22, 2015.

(51) Int. Cl.

| | |
|---|---|
| *F16L 55/168* | (2006.01) |
| *B29K 75/00* | (2006.01) |
| *B29K 105/08* | (2006.01) |
| *B29K 307/04* | (2006.01) |
| *B32B 5/26* | (2006.01) |
| *B29C 70/20* | (2006.01) |
| *B32B 5/28* | (2006.01) |
| *B29C 65/48* | (2006.01) |
| *B29C 70/22* | (2006.01) |
| *B29C 65/50* | (2006.01) |
| *F16L 58/10* | (2006.01) |
| *B29K 63/00* | (2006.01) |
| *B29K 309/08* | (2006.01) |

(52) U.S. Cl.
CPC ........ *B29C 65/485* (2013.01); *B29C 65/5014* (2013.01); *B29C 70/202* (2013.01); *B29C 70/226* (2013.01); *B29K 2063/00* (2013.01); *B29K 2075/00* (2013.01); *B29K 2105/089* (2013.01); *B29K 2307/04* (2013.01); *B29K 2309/08* (2013.01); *B32B 5/26* (2013.01); *B32B 5/28* (2013.01); *B32B 2260/021* (2013.01); *B32B 2260/023* (2013.01); *B32B 2260/046* (2013.01); *B32B 2262/101* (2013.01); *B32B 2262/106* (2013.01); *F16L 58/1063* (2013.01)

(58) Field of Classification Search
USPC ...... 428/423.1; 138/99; 156/60, 94, 95, 176, 156/178
See application file for complete search history.

(56) References Cited

U.S. PATENT DOCUMENTS

| | | | |
|---|---|---|---|
| 4,560,428 A | 12/1985 | Sherrick et al. |
| 4,898,898 A | 2/1990 | Fitzgerald |
| 5,030,493 A | 7/1991 | Rich |
| 5,560,985 A | 10/1996 | Watanabe |
| 5,607,527 A | 3/1997 | Isley, Jr. |
| 5,726,222 A | 3/1998 | Sawaoka |
| 5,732,743 A | 3/1998 | Livesay |
| 5,786,437 A | 7/1998 | Nicholas |
| 5,789,073 A | 8/1998 | Odagiri |
| 5,894,864 A | 4/1999 | Rich |
| 6,361,032 B1 | 3/2002 | Lawson |
| 6,386,236 B1 | 5/2002 | Buckley |
| 6,429,157 B1 | 8/2002 | Kishi |
| 6,475,596 B2 | 11/2002 | Hsiao |
| 6,620,471 B1 | 9/2003 | Do |
| 6,638,615 B2 | 10/2003 | Kobayashi |
| 6,660,395 B2 | 12/2003 | McGarry |
| 6,713,144 B2 | 3/2004 | Bundo |
| 6,780,923 B2 | 8/2004 | Guha |
| 6,815,053 B2 | 11/2004 | Inoue |
| 6,911,169 B2 | 6/2005 | Kwag |
| 7,026,043 B2 | 4/2006 | Jander |
| 7,026,377 B1 | 4/2006 | Grant |
| 7,048,985 B2 | 5/2006 | Mack |
| 7,151,129 B2 | 12/2006 | Ishikawa |
| 7,192,634 B2 | 3/2007 | Carter |
| 7,246,990 B2 | 7/2007 | Xie |
| 7,361,618 B2 | 4/2008 | Homma |
| 7,412,956 B2 | 8/2008 | Gotou |
| 7,513,275 B2 | 4/2009 | Lazzara |
| 7,673,550 B2 | 3/2010 | Karmaker |
| 7,682,274 B2 | 3/2010 | Akiyama |
| 7,832,983 B2 | 11/2010 | Kruckenberg |
| 7,856,778 B2 | 12/2010 | Pantelides |
| 8,101,035 B2 | 1/2012 | Stenard |
| 8,137,798 B2 | 3/2012 | Arai et al. |
| 8,168,292 B2 | 5/2012 | Morin |
| 8,241,739 B2 | 8/2012 | Schonfeld |
| 8,286,919 B2 | 10/2012 | Gerken |
| 8,309,213 B2 | 11/2012 | Clarke |
| 8,522,827 B2 | 9/2013 | Lazzara |
| 8,530,533 B2 | 9/2013 | Lehmann |
| 8,562,886 B2 | 10/2013 | Difonzo |
| 8,844,464 B2 | 9/2014 | Lazzara |
| 8,910,670 B2 | 12/2014 | Tseng |
| 8,957,120 B2 | 2/2015 | Berthevas |
| 8,980,395 B2 | 3/2015 | Ash |
| 9,067,341 B2 | 6/2015 | Wehner |
| 9,096,020 B2 | 8/2015 | Lazzara |
| 9,175,470 B2 | 11/2015 | Yin |
| 9,186,993 B1 | 11/2015 | Webb |
| 2002/0106464 A1 | 8/2002 | Bazinet |
| 2004/0050006 A1 | 3/2004 | Park |
| 2005/0287349 A1 | 12/2005 | Yu et al. |
| 2006/0016550 A1 | 1/2006 | Connors |
| 2007/0232764 A1 | 10/2007 | Minamida |
| 2008/0090966 A1 | 4/2008 | Hayes |
| 2010/0021682 A1 | 1/2010 | Liang |
| 2010/0143692 A1 | 6/2010 | Ryan |
| 2010/0147409 A1 | 6/2010 | Lu |
| 2010/0237606 A1 | 9/2010 | Lazzara |
| 2011/0000746 A1 | 1/2011 | Pelto-Huikko |
| 2012/0001393 A1 | 1/2012 | Lazzara |
| 2012/0283370 A1 | 11/2012 | Tamogami |
| 2013/0001817 A1 | 1/2013 | Bessho |
| 2013/0052899 A1 | 2/2013 | Li |
| 2013/1006546 | 3/2013 | Kang |
| 2013/0101762 A1 | 4/2013 | Malis |
| 2013/0160926 A1 | 6/2013 | Lazzara et al. |
| 2013/0210298 A1 | 8/2013 | Ortlepp |
| 2013/0316128 A1 | 11/2013 | Waku |
| 2014/0057514 A1 | 2/2014 | Goto |
| 2014/0178652 A1 | 6/2014 | Gross |
| 2014/0224374 A1 | 8/2014 | Tseng |
| 2014/0227928 A1 | 8/2014 | Ehbing |
| 2014/0338830 A1 | 11/2014 | Petroski |
| 2015/0005684 A1 | 1/2015 | Evans |
| 2015/0068633 A1 | 3/2015 | Lazzara |
| 2015/0098833 A1 | 4/2015 | Pointer |
| 2015/0140306 A1 | 5/2015 | Endo |
| 2015/0148498 A1 | 5/2015 | Block |
| 2015/0166830 A1 | 6/2015 | Tardy |
| 2015/0184333 A1 | 7/2015 | Arai |
| 2015/0191623 A1 | 7/2015 | Kaneiwa |
| 2015/0204476 A1 | 7/2015 | Lazzara |
| 2015/0247025 A1 | 9/2015 | Ichikawa |
| 2015/0299941 A1 | 10/2015 | Lazzara |
| 2015/0321448 A1 | 11/2015 | Lazzara |
| 2015/0345140 A1 | 12/2015 | Karle |
| 2015/0353770 A1 | 12/2015 | Burckhardt |
| 2016/0122539 A1 | 5/2016 | Okamoto |
| 2016/0320156 A1 | 11/2016 | Curliss |

FOREIGN PATENT DOCUMENTS

| | | |
|---|---|---|
| EP | 2196497 | 6/2010 |
| EP | 3006478 | 4/2016 |
| RU | 2256843 C1 | 7/2005 |
| RU | 2005119384 A | 12/2006 |
| WO | 92/17331 | 10/1992 |
| WO | 2012/010276 | 1/2012 |
| WO | 2014/196607 | 12/2014 |

OTHER PUBLICATIONS

Supplementary European Search Report and European Search Opinion for European Patent Application No. 16740671.9 dated Sep. 26, 2018 (8 pages).

(56) References Cited

OTHER PUBLICATIONS

Written Opinion of the International Preliminary Examining Authority for International Application No. PCT/US16/14115 dated Jan. 23, 2017 (5 pages).
International Search Report for International Application No. PCT/US16/14115 dated Apr. 29, 2016, 3 pages.
Written Opinion for International Application No. PCT/US16/14115 dated Apr. 29, 2016, 24 pages.
Written Opinion for International Application No. PCT/US 15/12522 dated May 4, 2015, 8 pages.
International Search Report for International Application No. PCT/US15/12522 dated May 4, 2015, 4 pages.
Syntho-Glass 24, Pipe Wrap and Pipeline Repair Product, Specification Sheet, Neptune Research, Inc., available prior to Sep. 2013, 1 page.
Viper Skin, Carbon Fiber Composite Reinforcement System, Specification Sheet, Neptune Research, Inc., available prior to Sep. 2013, 2 pages.
Trans-Wrap, Carbon Fiber Pipeline Repair System, Specification Sheet, Neptune Research, Inc. available prior to Sep. 2013, 1 page.
Titan Saturant Epoxy, Specification Sheet, Neptune Research, Inc., available prior to Sep. 2013, 1 page.
Titan 218, Carbon Fiber Structural Repair System, Specification Sheet, Neptune Research, Inc., available prior to Sep. 2013, 1 page.
Titan 118, Carbon Fiber Structural Repair System, Specification Sheet date prior to Sep. 2014, 1 page.
Thermo Wrap, Composite Repair System for High Temperature and Process Piping, Specification Sheet, Neptune Research, Inc., available prior to Sep. 2013, 1 page.
Thermo Wrap CF, Carbon Fiber Composite Repair System for High Temperature and Process Piping, Specification Sheet, Neptune Research, Inc., available prior to Sep. 2013, 1 page.
Syntho-Poxy HC—Two-Part Epoxy Compound, Specification Sheet, Neptune Research, Inc., available prior to Sep. 2013, 1 page.
Syntho-Glass NP, Non-Pressure Leak Repair Kit, Specification Sheet, Neptune Research, Inc., available prior to Sep. 2013, 1 page.
Syntho-Glass, Fiberglass Water-Activated Composite Solution, Specification Sheet, Neptune Research, Inc., available prior to Sep. 2013, 2 pages.
Syntho-Glass XT, Extreme Strength Fiberglass Composite System, Specification Sheet, Neptune Research, Inc., available prior to Sep. 2013, 2 pages.
Solar-Wrap, UV-Curable Composite Repair System, Specification Sheet, Neptunre Research, Inc., available prior to Sep. 2013, 1 page.
Rueda, S.H., "Curing, Defects and Mechanical Performance of Fiber-Reinforced Composites," Universidad Politecnica De Madrid, Escuela Tecnica Superior de Ingenieros de Caminos, Canales y Puertos, Apr. 2013, 198 pages.
Suhot, M.A. et al., "The Effect of Voids on the Flexural Fatigue Performance of Unidirectional Carbon Fibre Composites," 16th International Conference on Composite Materials, 2007, 10 pages.
Lenoe, E.M., "Effect of Voids on Mechanical Properties of Graphite Fiber Composites," prepared by AVCO Corporation, prepared for the U.S. Naval Air Systems Command, Contract No. N00019-07-C-0242, 1970, 55 pages.

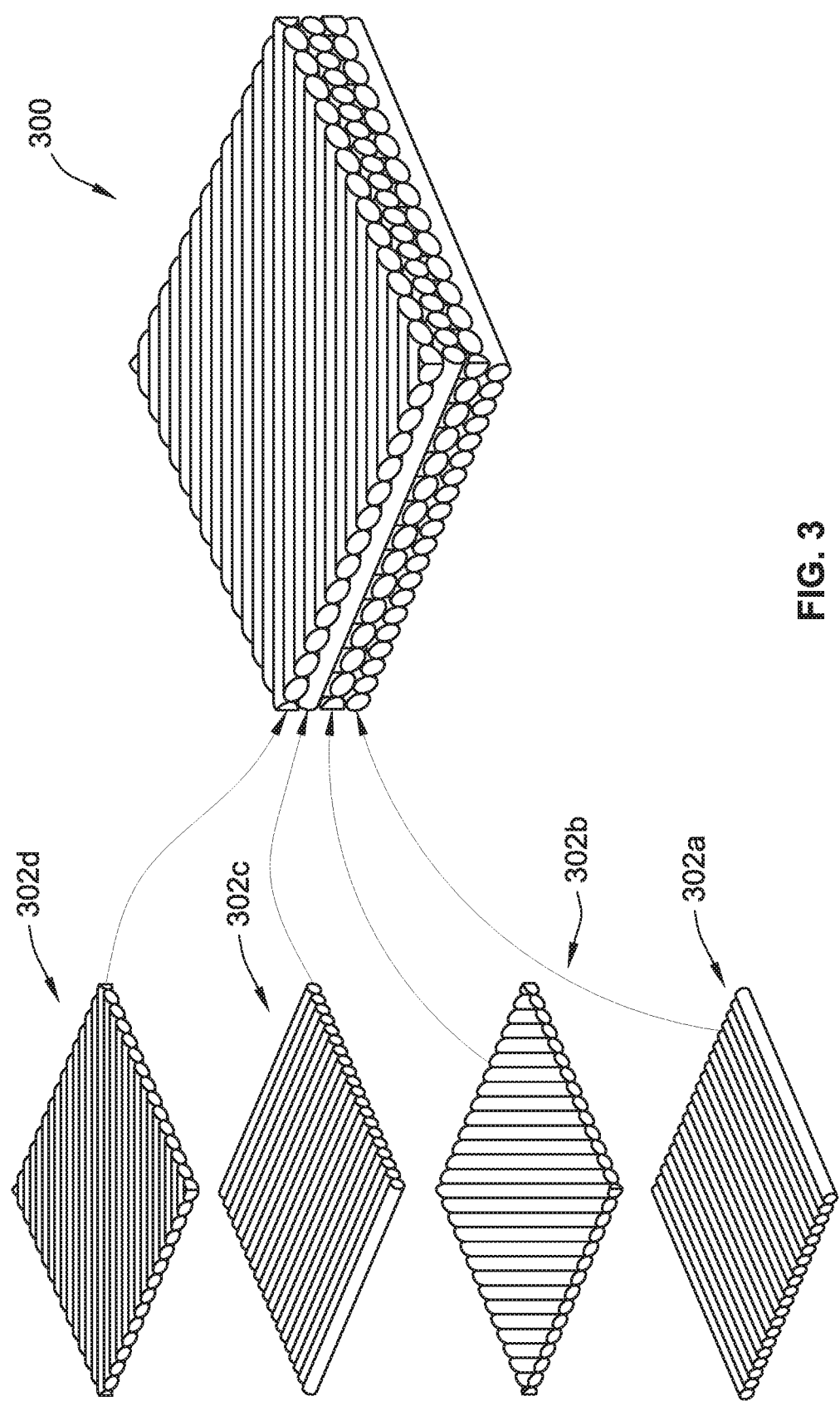

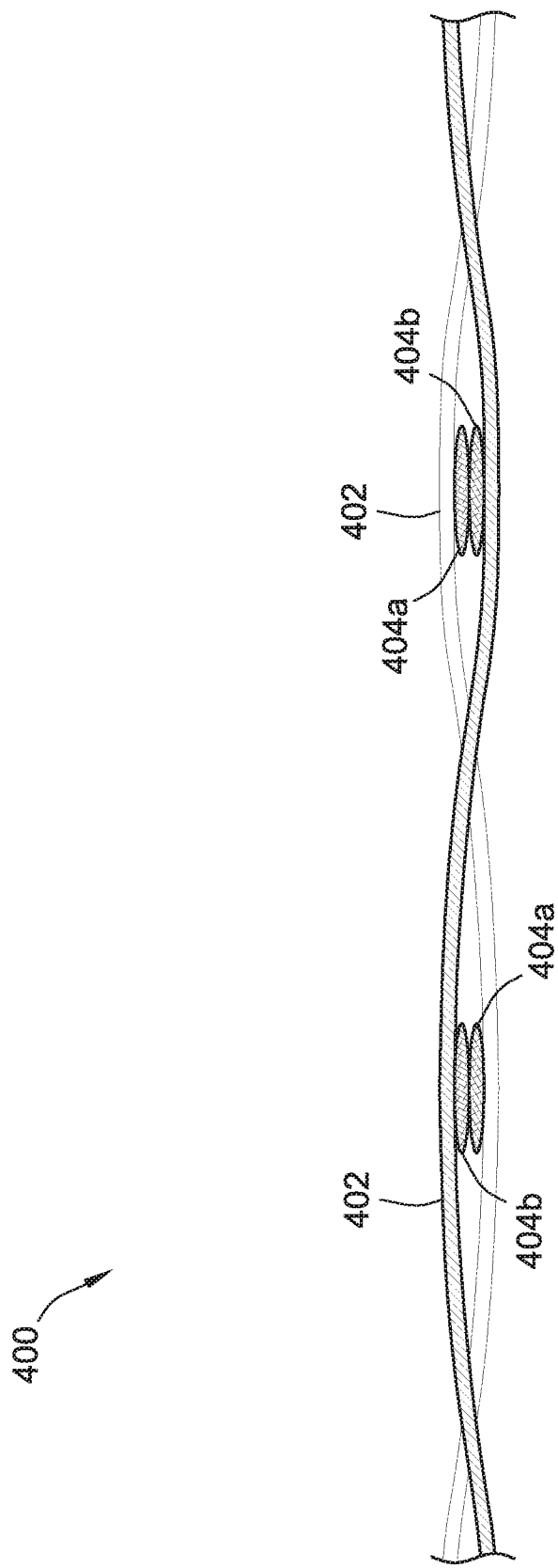

COMPOSITE REINFORCEMENT SYSTEMS AND METHODS OF MANUFACTURING THE SAME

CROSS-REFERENCE TO RELATED APPLICATIONS

This application is a divisional application of co-pending U.S. application Ser. No. 15/001,977, filed Jan. 20, 2016, which claims the benefit of earlier filed U.S. Provisional Application No. 62/106,629, filed Jan. 22, 2015, entitled, "COMPOSITE REINFORCEMENT SYSTEMS INCLUDING ALIPHATIC RESINS," and U.S. Provisional Application No. 62/195,560, filed Jul. 22, 2015, entitled, "COMPOSITE REINFORCEMENT SYSTEMS AND METHODS OF MANUFACTURING THE SAME," each of which applications is hereby incorporated by reference herein in its entirety.

TECHNICAL FIELD

The present invention relates to composite reinforcement systems for the reinforcement of physical structures. More particularly, the invention relates to composite reinforcement systems formed from a blend of reagents impregnated within a carrier.

BACKGROUND

Physical structures deteriorate over time as a result of natural causes (e.g., wind, rain, snow, temperature changes, humidity, etc.), suffer damage as a result of accidents or normal use, and may initially be formed with deficiencies or flaws that go un-detected until after deployment and/or use. Further, certain physical structures are covered by laws and/or regulations that define rules, constraints, and/or parameters within which the structures must comply, and such laws and/or regulations may change over time. These physical structures are an important aspect of a modern society and the proper manufacturing and maintenance of the structures is important to maintaining such a modern society.

As one example of the foregoing structures, conduit assemblies, such as pipelines and hydraulic circuits, are used to transport an assortment of fluids, such as water, oil, various natural and synthetic gases, sewage, slurries, hazardous materials, and the like. Conduit assemblies are formed from a variety of materials, including, for example, concrete, plastic (e.g., polyvinyl chloride, polyethylene), and various metallic materials, such as iron, copper, and steel. As another example of the foregoing structures, containment structures, such as storage tanks, are used to store an assortment of materials, such as solids and fluids, including oil, water, chemicals, various natural and synthetic fluids, sewage, hazardous materials, food, and the like. Containment structures are formed from a variety of materials, including concrete, plastic, and metallic materials, such as iron, copper, aluminum, and steel. As another example of the foregoing structures, load bearing structures, such as beams and concrete columns or pillars, form and/or support various buildings, bridges, and highway structures. Load bearing structures are constructed from various construction materials, such as wood, reinforced concrete, unreinforced concrete, aluminum, iron, steel, and the like.

To repair and/or maintain the foregoing structures, or to modify such structures to comply with new or updated laws and/or regulations, there is a need for improved repair and/or reinforcement systems that are quick, versatile, durable, minimally disruptive, and cost-effective, in all aspects of the manufacturing and application of the systems in the field.

SUMMARY

According to aspects of the present invention, a composite reinforcement system includes a carrier configured to be saturated with a resin. The resin includes an aliphatic isocyanate-functionalized prepolymer chemically configured to activate and harden after removal of the reactive precursor from a protective packaging. The protective packaging provides a generally inert interior environment. The carrier is saturated with the resin prior to application of the composite reinforcement system to a surface. The application of the composite reinforcement system to the surface thereby reinforces the surface.

According to further aspects of the present invention, a method of reinforcing a surface includes removing a composite reinforcement system from a protective packaging, applying the composite system to the surface, and allowing the resin to harden. The composite reinforcement system includes a carrier saturated with a resin. The resin includes an aliphatic isocyanate-functionalized prepolymer chemically configured to activate and harden after removal from the protective packaging. The protective packaging provides a generally inert interior environment. The hardening is configured to transition the composite system from generally flexible to generally rigid.

According to yet further aspects of the present invention, a kit of components for reinforcing a surface includes a composite reinforcement system including a carrier and a resin. The carrier is configured to be saturated with the resin. The resin includes an aliphatic isocyanate-functionalized prepolymer chemically configured to activate and harden after removal of the reactive precursor from a protective packaging. The protective packaging provides a generally inert interior environment.

Aspects of the disclosure include methods for forming a prepreg of a composite reinforcement system. The methods include forming a blend of at least two reagents chemically configured to react to form a moisture-curable prepolymer. The methods further include impregnating a carrier with the blend of the at least two reagents. After impregnation, the methods include allowing the at least two reagents impregnated within the carrier to react to form the prepreg of the moisture-curable prepolymer impregnated within the carrier.

Further aspects of the disclosure include a repair kit for reinforcement of a physical structure. The kit includes a pouch defining a moisture-tight enclosure. The kit also includes a carrier formed of a plurality of fibers located within the moisture-tight enclosure. The carrier is pre-impregnated with a blend of at least two reagents that result in a resinous material comprising a moisture-curable prepolymer based on a reaction of the at least two reagents within the carrier. The resinous material is in a partially cured state within the moisture-tight enclosure. The resinous material, after removal from the pouch, is configured to transition to a fully cured and hardened state on the physical structure in response to exposure to moisture. The at least two reagents include an isocyanate and an aromatic-group-containing polyol.

According to yet further aspects, a prepreg for a composite reinforcement structure is disclosed. The prepreg includes a carrier formed of a plurality of fibers. The prepreg also includes a blend of at least two reagents impregnated within the carrier. The at least two reagents are chemically configured to react to form a moisture-curable prepolymer. One of the reagents is an isocyanate, and another one of the reagents is an aromatic-group-containing polyol.

Further aspects of the disclosure include a method of making a repair-kit package to be used for reinforcing physical structures. The method includes moving a plurality of fibers through a blend of at least two reagents. The at least two reagents are permitted to react to form a moisture-curable prepolymer in a partially cured state, at least the moisture-curable prepolymer adhering the plurality of fibers together to form a flexible fiber layer. The flexible fiber layer is then placed within a moisture-tight enclosure of the repair-kit package. The moisture-tight enclosure is sealed to have the moisture-curable prepolymer remain in the partially cured state.

According to aspects of the present disclosure, a repair kit for reinforcement of a physical structure includes a moisture-tight enclosure, a carrier, and a moisture-curable prepolymer that impregnates the carrier in a partially cured state. The carrier is formed of a plurality of fibers and is within the moisture-tight enclosure. The moisture-curable prepolymer is formed of at least a polyfunctional aliphatic isocyanate and an aromatic-group-containing polyol.

According to further aspects of the present disclosure, a method of making a repair kit to be used for reinforcing a physical structure includes wetting a carrier of a plurality of fibers with at least two reagents, the at least two reagents being chemically configured to form a moisture-curable prepolymer. The method further includes placing the wetted carrier in a moisture-tight enclosure and sealing the moisture-tight enclosure to maintain the moisture-curable prepolymer in the partially cured state.

According to yet further aspects of the present disclosure, a composite reinforcement structure includes a carrier formed of a plurality of fibers. The composite reinforcement system further includes a blend of at least two reagents impregnated within the carrier, the at least two reagents being chemically configured to react to form a moisture-curable prepolymer. A first reagent of the at least two reagents is an isocyanate, and a second reagent of the at least two reagents is an aromatic-group-containing polyol.

These and other capabilities of the inventions, along with the inventions themselves, will be more fully understood after a review of the following figures, detailed description, and claims.

BRIEF DESCRIPTION OF THE DRAWINGS

FIG. 3 shows multiple plies of a carrier of a composite reinforcement system, in accord with aspects of the present disclosure;

FIG. 4C shows a cross-sectional view of the carrier of FIG. 4A along the line 4C-4C in FIG. 4A, in accord with aspects of the present disclosure.

Figure 1A:
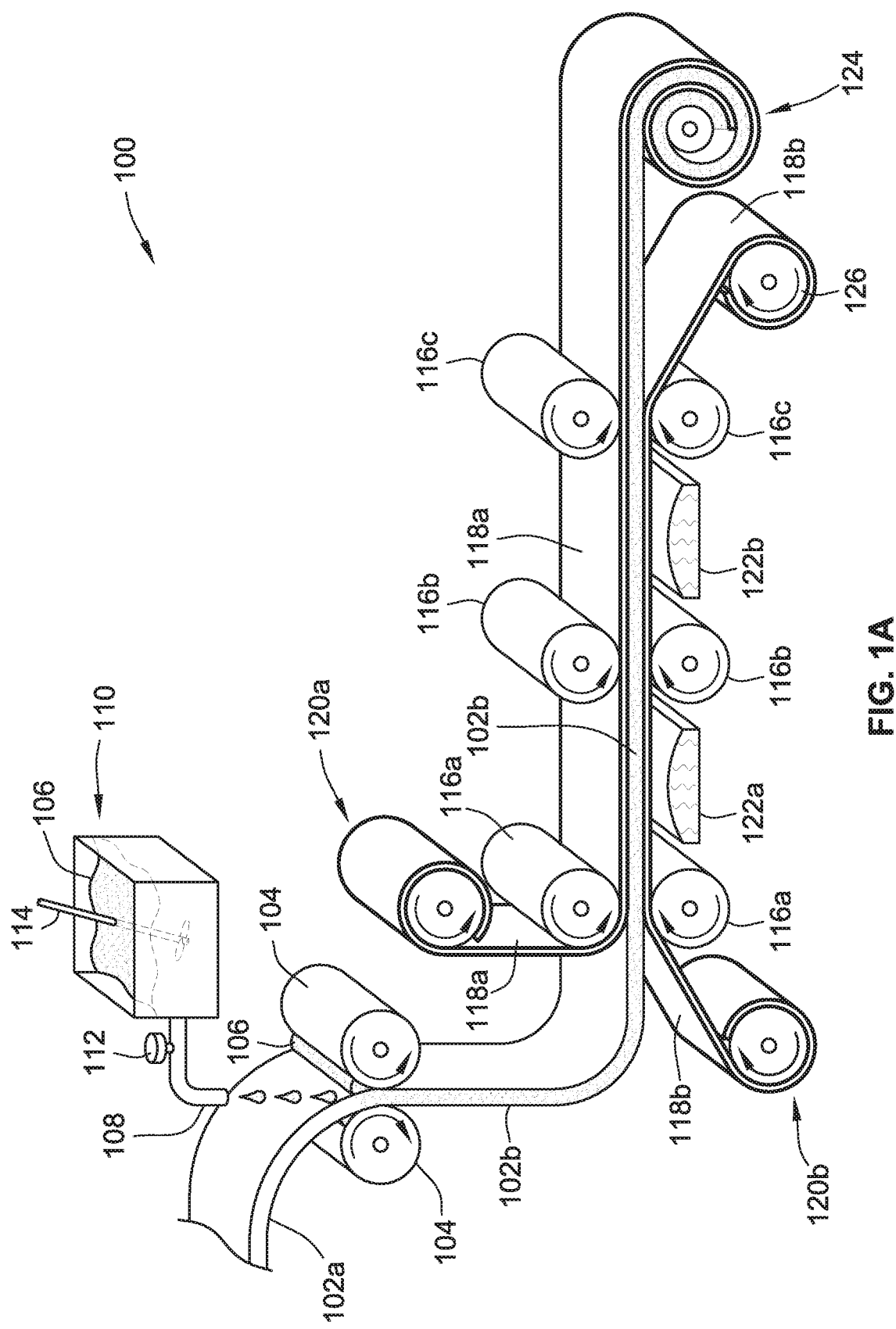
FIG. 1A shows a schematic diagram of an apparatus and associated process for preparing a prepreg roll impregnated with a partially cured resinous material, in accord with aspects of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While the inventions are susceptible of embodiment in many different forms, there is shown in the drawings and will herein be described in detail preferred embodiments of the inventions with the understanding that the present disclosure is to be considered as an exemplification of the principles of the inventions and is not intended to limit the broad aspect of the inventions to the embodiments illustrated. For purposes of the present detailed description, the singular includes the plural and vice versa (unless specifically disclaimed); the word "or" shall be both conjunctive and disjunctive; the word "all" means "any and all"; the word "any" means "any and all"; and the word "including" means "including without limitation." Additionally, the singular terms "a," "an," and "the" include plural referents unless context clearly indicates otherwise.

Systems and methods in accord with the present disclosure can be used to improve mechanical properties, chemical properties, versatility, user-friendliness, and consistency of composite reinforcement systems. An exemplary composite reinforcement system of the present disclosure includes a carrier that is impregnated with a resinous material, also referred to as a prepolymer, which allows the carrier initially to be flexible, with the prepolymer in a partially cured state, but then harden when fully cured. The fully cured state can be obtained by introducing moisture to the prepolymer, such as in the case of a moisture-curable prepolymer, such as an isocyanate prepolymer. A carrier that is impregnated with the resinous material (or prepolymer) is herein referred to as a prepreg. The composite reinforcement system of the prepreg formed of the carrier impregnated with the resinous material can be used to repair or reinforce physical structures, such as containment systems, pipelines, and conveyance systems, or load bearing structures such as columns or beams, to name a few examples.

The carrier for the composite reinforcement system of the present disclosure can be formed of various suitable materials, such as in the form of non-woven fibers and/or woven fibers. Woven fibers include fibers that are interconnected to form mechanical connections, such as in the examples of woven or knitted fabrics, or non-woven fabrics where the fibers are still entangled (e.g., interconnected). Other mechanical connections of woven fibers can include, for example, braided fibers, twisted or spun fibers (e.g., a plurality of small-diameter fibers twisted together), stitched fibers, or cross-stitched fibers.

Non-woven fibers include a plurality of generally parallel uni-directional fibers that are not mechanically connected through direct mechanical connections of the fibers themselves. Rather, a carrier formed of a plurality of uni-directional fibers can be held together or adhered (e.g., connected, bonded, etc.) through the stickiness and/or hardening of a resinous material applied to the plurality of fibers, with no mechanical connection (e.g., stitching, weaving, spinning, frictional connection, other type of mechanical fastening) between the individual fibers. In other aspects, the uni-directional fibers of a carrier can be connected, for example, through a hot melted fiber stitched axially and heated to connect the uni-directional fibers to keep them in place, but with the uni-directional fibers themselves not directly mechanically connected.

Some non-limiting examples of fibers that can be used for the composite reinforcement systems of the present disclosure include carbon fibers (both polyacrylonitrile (PAN) and pitch based), glass fibers (e.g., fiber glass), basalt fibers, aramid fibers, metal fibers, and/or combinations thereof. Other non-limiting exemplary aspects of carriers contemplated for the composite reinforcement system include the fiber-based materials for composite reinforcement systems described in U.S. Pat. No. 4,519,856, issued May 28, 1985, entitled, "Resin-Cloth Structural System"; U.S. Pat. No. 5,030,493, issued Jul. 9, 1991, entitled, "High Strength Resin-Cloth Structural System"; U.S. Pat. No. 8,522,827, issued Sep. 3, 2013, entitled, "Protective Seal For A Pipeline Assembly"; U.S. Patent Application Publication No. 2012/156378, published Jun. 21, 2012, entitled, "Systems, Methods, and Device For Applying Fluid Composites To Carrier Sheets"; and U.S. Patent Application Publication No. 2013/0160926, published Jun. 27, 2013, entitled, "Systems, Methods, and Device For Strengthening Fluid System Components Using Radiation-Curable Composites"; the disclosures of which are each hereby incorporated by reference herein in their entireties.

In some aspects, the carrier is formed of a fiberglass material. An exemplary fiberglass composite reinforcement system preferably comprises a woven filament, fiberglass cloth. In some aspects, the carrier is formed of a carbon-fiber material. The carbon-fiber material can be PAN-based and/or pitch-based carbon fibers. In some aspects, the carrier is a bi-axial, hybrid carbon fiber and fiberglass composite material. Such a bi-axial carbon fiber and fiberglass material may have carbon fibers and fiberglass extending the same direction or varying directions. In some aspects, a bi-axial carbon fiber and fiberglass material may be formed of the same weight percentage (wt %) of carbon fiber and fiberglass, or a varying wt % of carbon fiber and fiber glass. In some aspects, the carrier is a carbon fiber composite material such as uni-directional or bi-directional non-woven carbon-fiber composite or glass-fiber composite materials. In some aspects, the carrier is a bidirectional, woven fiberglass tape composite material. In some aspects, the carrier includes carbon fibers. In some aspects, the carrier includes glass fibers. In some aspects, the carrier includes basalt fibers. In some aspects, the carrier includes aramid fibers. In some aspects, the carrier includes liquid crystalline polyester fibers. In some aspects, the carrier includes metal fibers. In some aspects, the carrier includes combinations of any of the fibers disclosed herein. In some aspects, the carrier includes fabric- or fiber-based materials such as those described in U.S. Pat. No. 4,519,856, issued May 28, 1985, entitled, "Resin-Cloth Structural System"; U.S. Pat. No. 5,030,493, issued Jul. 9, 1991, entitled, "High Strength Resin-Cloth Structural System"; U.S. Pat. No. 8,522,827, issued Sep. 3, 2013, entitled, "Protective Seal For A Pipeline Assembly"; U.S. Patent Application Publication No. 2012/156378, published Jun. 21, 2012, entitled, "Systems, Methods, and Device For Applying Fluid Composites To Carrier Sheets"; and U.S. Pat. Application Publication No. 2013/0160926, published Jun. 27, 2013, entitled, "Systems, Methods, and Device For Strengthening Fluid System Components Using Radiation-Curable Composites."

In a conventional way for making prepregs, for non-woven fiber carriers, a tradeoff exists with respect to the viscosity of the resinous material impregnated within the fiber. The viscosity of the resinous material must be sufficiently high to adhere the non-woven fibers together to form the prepreg, enabling good tacky adherence of the prepreg during application on the physical structure. The viscosity of the resinous material must also be sufficiently low to enable good impregnation of the resinous material into the fibers during the prepreg manufacturing process. For prepregs made of woven fibers made in the conventional way, a similar tradeoff exists with respect to the viscosity of the resinous material. The viscosity of the resinous material must be sufficiently low to allow for impregnation of the resinous material within and/or between the woven fibers, while also being sufficiently high to maintain the carrier impregnated with the resinous material during storage and transportation of the prepreg and enable good tack during the application of the prepreg on the structure.

In accord with aspects of the present disclosure, an in situ synthesis of the resinous material during the prepreg manufacturing process is disclosed. The raw materials (also referred to herein as reagents) used to form the resinous material are mixed together during the prepreg manufacturing process to create a mixture of the reagents. The mixture can be a homogenous blend of at least the reagents such that the reagents are fully dispersed and mixed within the mixture. The reagents are selected to provide a sufficiently long reaction time to allow for the viscosity of the homogenous blend of reagents to remain relatively low during the impregnation process. The low viscosity allows the homogenous blend of reagents to impregnate the carrier of the composite reinforcement system, particularly a carrier formed of woven fibers. Accordingly, the impregnation process is not limited as in the case of conventional impregnation steps of a carrier with a high viscosity resinous material.

Upon impregnating the carrier with the homogenous blend of reagents, the reagents react to form the resinous material. Initially, the homogenous blend of reagents forms a mixture that is far from the gel point of the intended resinous material. After impregnating the carrier with the homogenous blend of reagents, the reagents slowly react to form the prepolymer. An amount of one or more of the reagents is controlled to limit the reaction of the reagents to form a resinous material in a partially cured state. By way of example, and without limitation, the partially cured state of the prepolymer is close to the gel point. The result is a carrier that is impregnated with a resinous material in a partially cured state, but without deficiencies in the impregnation process based on the initial impregnation being of the homogenous blend of reagents rather than of the resinous material directly. The partially cured state allows for the prepreg to remain flexible for application of the prepreg on a physical structure to be reinforced. However, the prepreg maintains its shape and, in the case of non-woven fibers, maintains the non-woven fibers in a mechanically connected state through the chemical connections formed within the resinous material. Based on the foregoing in situ process, a resulting prepreg can be formed of a carrier impregnated with an extremely high viscosity resinous material.

FIG. 1A illustrates a schematic diagram of an apparatus 100 and associated process for preparing a prepreg roll impregnated with a partially cured resinous material or prepolymer. As shown, the process begins with a non-impregnated carrier 102a. The non-impregnated carrier 102a is fed into the apparatus 100 from a feed reel (not shown). Alternatively, such as in the case of a woven carrier, the non-impregnated carrier 102a can be feed into the process from an apparatus (e.g., a loom) that forms (e.g., weaves) the non-impregnated carrier 102a. The non-impregnated carrier 102a can be any of the above-described carriers, such as a non-woven carrier, including uni-directional carbon fibers or uni-directional glass fibers, a woven carrier, including carbon fibers woven to form a woven carbon fiber fabric, and a bi-axial carrier formed of carbon fibers and fiberglass fibers.

The non-impregnated carrier 102a is fed between a pair of pinch rollers 104. At the same time, a homogenous blend of reagents 106 is deposited on the pinch rollers 104. The action of the non-impregnated carrier 102a passing through the collected homogenous blend of reagents 106 and between the pinch rollers 104 causes the homogenous blend of reagents 106 to impregnate into the carrier 102a. The spacing of the pinch rollers 104 can be configured based on the thickness of the non-impregnated carrier 102a to force the homogenous blend of reagents 106 into the carrier 102a as the non-impregnated carrier 102a feeds through the pinch rollers 104. The details of the various constituents that comprise the homogenous blend of reagents 106 are described in more detail below.

The homogenous blend of reagents 106 is supplied from an outlet 108 of a vat 110. A valve 112 controls the flow rate of the homogenous blend of reagents 106 out of the outlet 108 to supply the homogenous blend of reagents 106 at a rate sufficient to impregnate the non-impregnated carrier 102a to a desired impregnation amount based, for example, on the feed rate of the non-impregnated carrier 102a through the apparatus 100.

The vat 110 can contain the homogenous blend of reagents 106 pre-mixed prior to, for example, supplying the homogenous blend of reagents 106 to the pinch rollers 104 and the non-impregnated carrier 102a. Such a supply of the homogenous blend of reagents 106 can be considered a batch process. Alternatively, the homogenous blend of reagents 106 can be blended and mixed within the vat 110 during the impregnation process. Such a supply of the homogenous blend of reagents 106 can be considered a continuous process. Regardless of whether the homogenous blend of reagents 106 is supplied as part of a batch process or a continuous process for forming the homogenous blend of reagents 106, the vat 110 can include a stirrer 114 to stir the homogenous blend of reagents 106. Alternatively, the vat 110 itself can be a mixer without the stirrer 114, such as in the case of a FlackTek mixer. For a homogenous blend of reagents 106 with a high homogeneity, at least the reagents within the homogenous blend of reagents 106 that form the moisture-curable prepolymer are miscible. The miscibility of the reagents aids in providing an even distribution of the reagents (discussed in further detail below). In some aspects, one or more compatibilizing agents can be added to the homogenous blend of reagents 106 to increase the miscibility of the reagents.

At the outlet of the pinch rollers 104 is an impregnated carrier 102b. The impregnated carrier 102b is impregnated with the homogenous blend of reagents 106. Based on the reagents used, a portion of the reagents may have already reacted to form the resinous material or moisture-curable prepolymer. Yet, the homogenous blend of reagents 106 at the pinch rollers 104 has a low viscosity that allows for the homogenous blend of reagents 106 to impregnate the non-impregnated carrier 102a. The low viscosity is, in part, based on the reaction rate of the reagents being not fast enough relative to the time it takes to impregnate the carrier 102a. Thus, based, in part, on the reaction rate, the impregnated carrier 102b is impregnated with the homogenous blend of reagents 106 to a desired amount and impregnation is not limited by the viscosity of the impregnated mixture, as in the conventional case of impregnating a carrier directly with a resinous material.

The amount of homogenous blend of reagents 106 used to impregnate the carrier 102 may vary depending on, for example, the specific use intended from the impregnated carrier 102b. In some aspects, the impregnated carrier 102b can be about 40 to 60 wt % carrier 102 and about 60 to 40 wt % homogenous blend of reagents 106. In some aspects, the impregnated carrier 102b is about 50 wt % carrier 102 and about 50 wt % homogenous blend of reagents 106.

As an alternative to the pinch rollers 104 for impregnating the non-impregnated carrier 102a with the homogenous blend of reagents 106, the non-impregnated carrier 102a can pass through a bath (not shown) of the homogenous blend of reagents 106. The bath can be a separate container of the homogenous blend of reagents 106, other than the vat 110. Alternatively, the non-impregnated carrier 102a can pass directly through the vat 110. By way of example, and without limitation, the reagents that form the homogenous blend of reagents 106 for the resinous material can be added into the vat 110 according a continuous process while the non-impregnated carrier 102a passes through the vat 110.

As a further alternative to the pinch rollers 104, and in the case of a woven non-impregnated carrier 102a, the homogenous blend of reagents 106 can be impregnated into the non-impregnated carrier 102a as the carrier is being woven into, for example, a fabric. By way of example, and without limitation, the homogenous blend of reagents 106 can be distributed within a loom used to form the woven non-impregnated carrier 102a.

After the pinch rollers 104, the impregnated carrier 102b is fed to a pair of compression rollers 116a. At the pair of compression rollers 116a, opposite sides of the impregnated carrier 102b are backed by backing films 118a and 118b. The backing films 118a and 118b can be various films that do not stick or are removable from the impregnated carrier 102b, such as, for example, polyethylene terephthalate (PET) film. Backing film 118a is fed in from a let off roller 120a and backing film 118b is fed in from a let off roller 120b. The backing films 118a and 118b protect the impregnated carrier 102b through the apparatus 100, such as protecting the impregnated carrier 102b from sticking to components of the apparatus 100. Although shown as including both backing films 118a and 118b, the process may alternatively have only one backing film added to the impregnated carrier 102b, such as backing film 118a or 118b. Even further, alternatively, none of the backing films 118a and 118b may be present in the process without departing from the spirit and scope of the present disclosure. The pair of compression rollers 116a compresses the backing films 118a and 118b against the impregnated carrier 102b. Additionally, the compression rollers 116a maintain the impregnated carrier 102b at a set thickness as the homogenous blend of reagents 106 reacts to form the resinous material. Alternatively, the compression rollers 116a can further compress the impregnated carrier 102b. By way of example, and without limitation, the compression rollers 116a allow for the non-impregnated carrier 102a to be thicker (e.g., less dense) than an intended final thickness of the impregnated carrier 102b to aid in the impregnation of the homogenous blend of reagents 106 in the carrier 102a. As a result, the output of the pair of compression rollers 116a is the impregnated carrier 102b backed on both sides by the backing films 118a and 118b and at a set thickness.

The impregnated carrier 102b is then fed across a heater 122a. The heater 122a heats the impregnated carrier 102b to control or modify the reaction (e.g., reaction rate) of the homogenous blend of reagents 106 impregnated within the impregnated carrier 102b. For example, upon mixing the reagents within the vat 110, the reagents begin to react to form the desired moisture-curable prepolymer of the final prepreg. The heater 122a can supply heat to the impregnated carrier 102b fed across the heater 122a to, for example, accelerate the reaction between the reagents.

After the heater 122a, the impregnated carrier 102b is then fed through a pair of compression rollers 116b. Similar to the compression rollers 116a, the compression rollers 116b maintain the impregnated carrier 102b to a certain thickness and further guide the impregnated carrier 102b through the apparatus 100.

The impregnated carrier 102b is then fed across another heater 122b to further control or modify the reaction of the homogenous blend of reagents 106 impregnated within the impregnated carrier 102b. Similar to above, the heater 122b can heat the impregnated carrier 102b to accelerate the reaction of the reagents to accelerate the formation of the moisture-curable prepolymer. Alternatively, rather than the heater 122b, after the pair of compression rollers 116b can be a cooler (not shown) to control or modify the reaction of the homogenous blend of reagents 106 impregnated within the impregnated carrier 102b. For example, a cooler can cool the impregnated carrier 102b to slow the reaction between the reagents or improve the ability to remove the backing film 118b on to the roller 120b.

After being fed across the heater 122b (or cooler), the impregnated carrier 102b is fed through a pair of compression rollers 116c to further control the thickness of the impregnated carrier 102b between the backing films 118a and 118b and to guide the impregnated carrier 102b through the apparatus 100.

After the pair of compression rollers 116c, the backing film 118b is removed from the impregnated carrier 102b and is taken up on a take-up reel 126. After removing the backing film 118b, the impregnated carrier 102b is rolled-up into a prepreg roll 124. The remaining backing film 118a prevents the impregnated carrier 102b from sticking to adjacent layers within the prepreg roll 124. Upon formation of the prepreg roll 124, the process, according to some embodiments, is complete. The homogenous blend or reagents in the prepreg roll 124 is allowed to react until the limiting reagent(s) are exhausted. As described above, a concentration of the limiting reagent is selected so that the percent isocyanate, or weight fraction of isocyanate groups in the material (% NCO), in the resulting moisture-curable prepolymer is, for example, 5 to 18% NCO, more preferably, 6 to 14% NCO, and even more preferably, 8 to 12% NCO. The resulting moisture-curable prepolymer is in a partially cured state such that the prepreg of the prepreg roll 124 is in a flexible state but the resinous material of the moisture-curable prepolymer remains impregnated within the carrier. In the case of a non-woven carrier, the resinous material also adheres the unidirectional fibers together while still allowing the prepreg to bend and flex.

Figure 1B:
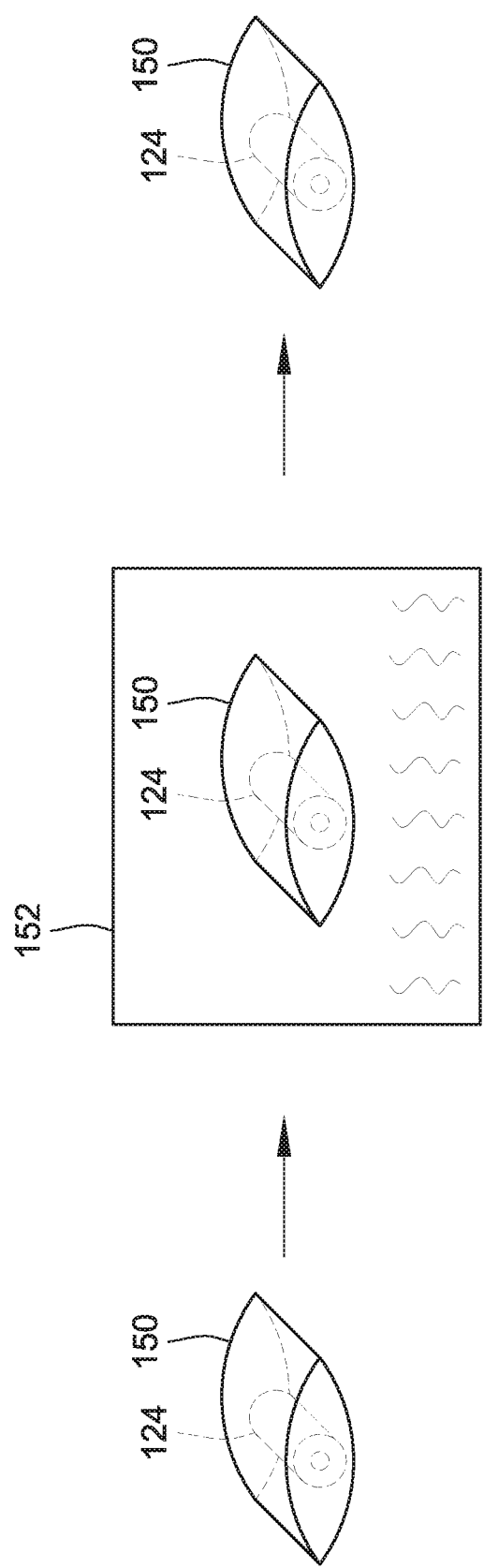
FIG. 1B shows an optional additional process for preparing a prepreg roll after the process of FIG. 1A, in accord with aspects of the present disclosure.

FIG. 1B illustrates an optional heating process that can occur after forming the prepreg roll 124 in FIG. 1A, in accord with aspects of the present disclosure. The process begins after formation of the prepreg roll 124 by packaging the prepreg roll 124 within an enclosure or container 150. The container 150 inhibits or prevents water (e.g., liquid water, water vapor, etc.) from entering the container 150, thereby causing a premature curing/hardening of the prepreg roll 124. The container 150 can be vacuum sealed upon depositing the prepreg roll 124 within the container 150 and/or contain a desiccant to sustain a dry environment with the container 150. Alternatively, the container 150 can be filled with an inert volume of material that will not cause the prepreg roll 124 to prematurely cure/harden. By way of example, and without limitation, the inert volume of material can be a gas, such as nitrogen. Alternatively, a fixed amount of water in the form of liquid water or water vapor may initially be in the container 150 when the prepreg roll 124 is deposited in the container 150. The container 150 then limits or prevents any additional water from entering into the container 150 to prematurely cure or harden the prepreg roll 124. Any water initially in the container 150 may merely partially cure the prepreg roll 124 to a desired partial cure amount. In other words, the container 150 may be designed to hold a known amount of water (vapor or liquid) to result in a further curing of the prepreg roll 124 within the container. Further, it should be noted that the prepreg roll 124 is not required as the prepreg may be present in a layer (or a plurality of layers) within the container 150.

After the prepreg roll 124 is deposited within the container 150 and the container 150 is sealed, the container 150 is placed inside an oven 152 and is heated. The container 150 and the prepreg roll 124 can be heated at, for example, 40 to 60° C., such as 55° C., to accelerate and/or complete the reaction between the homogenous blend of reagents 106 and form the moisture-curable prepolymer impregnated within the carrier. The container 150 and the prepreg roll 124 can be heated for various lengths of time depending on the formulation used, such as, for example one hour. However, the length of time can be less than or greater than one hour without departing from the scope of the present concepts. After heating the prepreg roll 124 within the container 150 at the desired temperature and for the desired period of time, the container 150 is removed from the oven 152 and allowed to cool. At this point, the reaction of the homogenous blend of reagents is complete.

The prepreg roll 124 can be prepared as part repair kit. The kit includes, for example, a composite reinforcement system including a carrier impregnated with a resinous material that is sealed in a protective packaging of the container 150, such as a moisture-tight pouch. As discussed in greater detail below, the composite reinforcement system can be a prepreg composite reinforcement system where the carrier is impregnated with an aliphatic isocyanate-functionalized prepolymer prior to storage. The container 150 with the prepreg roll 124 can have a wide range of storage temperatures that will typically be determined by the type of prepolymer used. Alternatively, the composite reinforcement system can be a field-applied system, and the kit can have a wide range of storage temperatures that will typically be determined by the type of aliphatic resin used.

As an alternative to the process in FIG. 1B, and as described in greater detail below, the homogenous blend of reagents 106 can include one or more catalysts. The catalysts can be added to accelerate the curing process. Accordingly, addition of the one or more catalysts can obviate the need for the process shown in FIG. 1B, and the catalysts can achieve the same result. Alternatively, one or more catalysts added to the homogenous blend of reagents 106 may accelerate curing, in combination with the baking process described above. Moreover, the catalysts do not affect or have little impact on the ultimate strength of the final, fully cured resin. As will be described in greater detail below, a catalyst can also be added to accelerate the moisture curing during the final application of the prepreg to a physical structure to be reinforced. Such a catalyst may or may not influence the prepolymer synthesis during the forming of the prepreg.

Various resinous materials can be formed from various reagents according to the process described above with respect to FIG. 1A for impregnating a carrier. Resinous materials contemplated for composite reinforcement systems and used with respect to the above-described process can include aliphatic or aromatic isocyanate-functionalized prepolymers that are moisture-curable. Surprisingly, use of composite materials having aliphatic isocyanate-functionalized prepolymers that are contemplated by the present disclosure provide many desirable benefits over the aromatic isocyanate-functionalized prepolymers. For example, use of aliphatic isocyanate-functionalized prepolymers yield a lower gas production rate during the final curing process than aromatic isocyanate-functionalized prepolymers. More specifically, aliphatic isocyanate-functionalized prepolymers of lower-percent isocyanate (% NCO) will generate less carbon dioxide than similar compounds of higher-percent NCO. The generation of carbon dioxide may cause the formation of voids or bubbles in the final, fully cured resin. The formation of voids or bubbles compromises the structural integrity of the composite reinforcement system. Effects of and problems associated with voids are detailed by, for example, Silvia Hernández Rueda, "Curing, Defects and Mechanical Performance of Fiber-Reinforced Composites," Universidad Politécnica De Madrid, Escuela Técnica Superior de Ingenieros de Caminos, Canales y Puertos (2013) (Doctoral Thesis) (198 pages); Mohamed A. Suhot et al., "The Effect of Voids on the Flexural Fatigue Performance of Unidirectional Carbon Fibre Composites," 16th Int'l Conf. on Composite Mat'ls (2007) (10 pages); Lenoe, Edward M., "Effect of voids on Mechanical Properties of Graphite Fiber Composites," prepared by AVCO Corporation and submitted to the U.S. Naval Air Systems Command under contract No. N00019-07-C-0242 (1970) (55 pages), the disclosures of which are each incorporated by reference herein in their entireties. Less carbon dioxide production and production rate during curing results in fewer voids in the fully cured resins, leading to more desirable mechanical properties, such as an increased strength when the aliphatic isocyanate-functionalized prepolymers are used for a composite reinforcement system.

The curing process (sometimes referred to as "wetting") of aliphatic isocyanate-functionalized prepolymers generally takes longer than aromatic isocyanate-functionalized prepolymers. The longer curing time allows gases produced during the curing process to permeate and escape the curing resinous material. This results in fewer voids in the cured resins, leading to more desirable mechanical properties, such as strength, when an aliphatic isocyanate-functionalized prepolymer is used in a composite reinforcement system. In addition to a lower overall production of carbon dioxide, any carbon dioxide that is produced by an aliphatic isocyanate-functionalized prepolymer has a lower rate of production. When the carbon dioxide production rate is reduced, carbon dioxide can leave the curing resinous material by diffusion rather than forming bubbles or voids by nucleation. Additionally, the use of an aliphatic isocyanate-functionalized compounds in a composite reinforcement system for a physical structure, such as a containment structure, conveyance structure, or a load-bearing structure, further minimizes laminate rise, which allows for more desirable mechanical properties, such as increased strength, by reducing voids and strain on the plies within the composite material or layers of an applied (e.g., wrapped) composite material. Moreover, the longer curing time and the permeation of gasses produces less foam within the curing resinous material, thus reducing voids in the fully cured resin, inhibiting collapse of the voids in the curing resinous material and the fully cured resin, and increasing strength of the material.

A slower curing process also provides the desirable aspect of allowing for faster overall application of a composite reinforcement system. For example, faster-curing resins, such as aromatic isocyanate-functionalize prepolymers, can lead to production of foam on the curing surface, forcing the composite reinforcement system away from the surface to be reinforced, possibly leading to unwanted voids within the composite reinforcement system. In order to reduce movement away from the surface, several layers are applied to the surface and then compressed for a period of time while the resinous material partially cures before the application of more layers to inhibit the effects of the rapid off-gassing. Layers will have to be applied and compressed in stages to properly repair and/or reinforce the surface. A desirable aspect of composite reinforcement systems employing aliphatic isocyanate-functionalized prepolymers is that a greater number of layers can be applied to the physical structure that is being reinforced before the composite reinforcement system needs compression, if compression is needed at all. The ability to apply greater numbers of layers to the physical structure without stopping results in valuable time savings during a repair or reinforcement of the physical structure, particularly where multiple layers of composite reinforcement are needed to meet the desired post-repair mechanical properties of the physical structure. Moreover, the lower amount of carbon dioxide produced and slower production of carbon dioxide also minimizes or even prevents a drop in the through-thickness modulus. The through-thickness modulus is a measure of strain transfer through the thickness of a system. Accordingly, use of aliphatic isocyanate-functionalized prepolymer also provides benefits to the composite reinforcement system because strain caused by expansion of the structure (e.g., expansion of a pipe under internal pressure) will be transferred through all layers of the composite reinforcement system, which maintains or increases the overall effectiveness of the system.

Composite reinforcement systems employing aliphatic isocyanate-functionalized prepolymers can also provide enhanced physical properties of the fully cured resin within the composite reinforcement system. For example, the lower porosity of the fully cured resin increases permeability during and after curing. Further, use of aliphatic isocyanate-functionalized prepolymers provides the composite reinforcement system with UV resistance. For example, aliphatic isocyanate-functionalized polyurethane thermoplastics and thermosets are more UV stable than aromatic isocyanate-functionalized thermoplastics and thermosets.

Further, composite reinforcement systems employing aliphatic isocyanate-functionalized prepolymers allow for more-accurate mixing of the components because the composite reinforcement systems are manufactured at a facility where controlled and reliable preparation of the systems and components is possible, as exemplified in the process in FIG. 1A. For example, the reagents within the homogenous blend of reagents 106 are mixed using more-accurately measured amounts of each component than field-mixed components. These accurate ratios provide for more controlled reactions during the partial cure process and more controlled performance of the composite reinforcement system. Additionally, the mixing and application of the homogenous blend of reagents 106 to the non-impregnated carrier 102a occurs under more-controlled conditions, such as humidity and temperature, to provide for more predictable performance at the manufacturing facility. Moreover, prepreg composite reinforcement systems allow for larger lot or batch sizes when mixing the homogenous blend of reagents 106. These larger lot sizes provide for more consistent chemistry and mechanical performance between prepreg composite reinforcement systems than the necessarily smaller-batch field-applied mixes.

Based on the foregoing, and according to some aspects, the homogenous blend of reagents 106 can be various reagents that react to form an aliphatic isocyanate-functionalized prepolymer. The prepolymer includes functional groups that terminate in aliphatic isocyanates to achieve the benefits discussed above as compared to, for example, aromatic isocyanates. Such aliphatic isocyanate-functionalized prepolymers include, for example, aliphatic isocyanate-functionalized polyurethane prepolymers, aliphatic isocyanate-functionalized polyurea prepolymers, aliphatic isocyanate-functionalized polyurea-urethane hybrid prepolymers, and aliphatic isocyanate-functionalized polyamide prepolymers.

The benefits of an aliphatic resin are illustrated through samples that were prepared and tested to determine the performance of the various preparations. Below is a table summarizing the various samples that were prepared for testing. The "12% NCO MDI" resin is an aromatic isocyanate-functionalized resin having 12 wt % isocyanate and is based on diphenylmethane diisocyanate. The "Aliphatic" resin is an aliphatic isocyanate-functionalized resin having 5.2% isocyanate prepolymer that is based on dicyclohexylmethane-4,4'-diisocyanate. The "17.7% NCO MDI" resin is an aromatic resin having 17.7% isocyanate and is based on diphenylmethane diisocyanate. All samples were prepared using a carbon fiber carrier material that was produced from poly-acrylonitrile (PAN) precursor and are surface treated to promote adhesion to organic matrix polymers.

| Formulation | Resin | Fumed Silica | Hindered amine chain extender | Hydroxyethyl Oxazolidine Intermediate |
|---|---|---|---|---|
| A | 12% NCO MDI | 10 wt % | — | — |
| B | 12% NCO MDI | 10 wt % | — | 5 wt % |
| C | 12% NCO MDI | 6.5 wt % | — | 2 wt % |
| D | 12% NCO MDI | — | 4.5 wt % | 5 wt % |
| E | 12% NCO MDI | — | 5 wt % | — |
| F | 12% NCO MDI | — | — | 5 wt % |
| G | 12% NCO MDI | 6.5 wt % | — | — |
| H | 12% NCO MDI | 6.5 wt % | — | 5 wt % |
| I | 12% NCO MDI | — | 7 wt % | 5 wt % |
| J | 12% NCO MDI | 8 wt % | — | — |
| J | 12% NCO MDI | 8 wt % | — | 5 wt % |
| L | 12% NCO MDI | — | 8 wt % | — |
| M | 12% NCO MDI | — | 9.5 wt % | — |
| N | 12% NCO MDI | — | 9.5 wt % | 5 wt % |
| O | 12% NCO MDI | — | — | — |
| P | Aliphatic | 6.5 wt % | — | — |
| Q | Aliphatic | 8 wt % | — | — |
| R | Aliphatic | — | — | — |
| S | 17.7% NCO MDI | — | — | — |

Both tensile testing and short-beam testing were performed. Panels for tensile testing were fabricated by saturating unidirectional carbon fibers with resin at a 30-35% resin weight ratio. The fiber sheets with resin were cut into eight 12"×12" pieces. Each of the 8 sheets were sprayed with water and laid one on top of another to produce a panel on a solid surface. The panel was allowed to cure and later was cut into five 1"×12" rectangular specimens. The thickness of each cured panel was measured and recorded. The specimens were tested in the tensile machine to determine the modulus of elasticity as per ASTM D3039. Below is a table summarizing the test results of the various samples.

| Formulation | Panel Free Rise Height (in) | Panel ply thickness (mils) | Modulus of Elasticity (Msi) |
|---|---|---|---|
| A | 0.369 | 46 | 4.5 |
| B | 0.441 | 55 | 3.4 |
| C | 0.375 | 47 | 8.3 |
| D | 0.530 | 66 | 2.9 |
| E | 0.610 | 76 | 1.7 |
| F | 0.432 | 54 | 4.1 |
| G | 0.277 | 35 | 3.8 |
| H | 0.440 | 55 | 4.0 |
| I | 0.583 | 73 | 1.7 |
| J | 0.299 | 37 | 3.9 |
| J | 0.466 | 58 | 3.2 |
| L | 0.385 | 48 | 4.4 |
| M | 0.635 | 79 | 1.3 |
| N | 0.606 | 76 | 1.6 |
| O | 0.434 | 54 | 4.6 |
| P | 0.320 | 40 | 8.0 |
| Q | 0.325 | 41 | 8.1 |
| R | 0.328 | 41 | 9.2 |
| S | 0.537 | 67 | 2.2 |

Panels for short beam shear testing were fabricated by saturating unidirectional carbon fibers with resin at a 30-35% resin weight ratio. The fiber sheets with resin were cut into fourteen 6"×12" pieces. Each of the fourteen sheets were sprayed with water and laid one on top of another to produce a panel on a curved surface. The diameter of the curved surface was 12.75". The panel was constricted with banding plastic and allowed to cure as is done in the field. After cure, the panels were cut into specimens having a length-to-thickness ratio of 4:1 and width of 0.5" as per ASTM D 2344. The specimens were tested in the tensile machine under the compression mode to determine the modulus of elasticity defined as the initial slope of the stress-displacement curve. Below is a table summarizing the results for the short beam shear testing.

| Formulation | Installed Resulting Height (in) | Installed ply thickness (mils) | Short Beam Modulus of Installed Product (ksi) |
|---|---|---|---|
| A | 0.275 | 20 | 44.8 |
| B | 0.382 | 27 | 22.3 |
| C | 0.286 | 20 | 56.2 |
| D | 0.334 | 24 | 22.0 |
| E | 0.279 | 20 | 42.6 |
| F | 0.285 | 20 | 25.7 |
| G | 0.267 | 19 | 69.9 |
| H | 0.288 | 21 | 31.4 |
| I | 0.326 | 23 | 27.6 |
| J | 0.275 | 20 | 45.8 |
| J | 0.289 | 21 | 31.3 |
| L | 0.339 | 24 | 57.2 |
| M | 0.328 | 23 | 33.8 |
| N | 0.382 | 27 | 38.5 |
| O | 0.247 | 18 | 64.9 |
| P | 0.235 | 17 | 257.7 |
| Q | 0.219 | 16 | 367.3 |
| R | 0.207 | 15 | 142.9 |
| S | 0.293 | 21 | 108.2 |

In some aspects, a more desirable combination of fiber and resin is the combination that produces the highest modulus in tension and short beam shear. A performance product measure was calculated to determine preferred formulations. The performance product was determined by normalizing the modulus of elasticity of the composite for both tensile and short beam. The product of the two was taken as the performance product. Below is a table summarizing the results of this calculation for the same 19 formulations from the above table.

| Formulation | Modulus of Elasticity Composite | Modulus Short beam | Performance Product |
|---|---|---|---|
| A | 0.49 | 0.12 | 0.06 |
| B | 0.37 | 0.06 | 0.02 |
| C | 0.90 | 0.15 | 0.14 |
| D | 0.31 | 0.06 | 0.02 |
| E | 0.18 | 0.12 | 0.02 |
| F | 0.44 | 0.07 | 0.03 |
| G | 0.42 | 0.19 | 0.08 |
| H | 0.43 | 0.09 | 0.04 |
| I | 0.19 | 0.08 | 0.01 |
| J | 0.43 | 0.12 | 0.05 |
| J | 0.35 | 0.09 | 0.03 |
| L | 0.48 | 0.16 | 0.07 |
| M | 0.14 | 0.09 | 0.01 |
| N | 0.17 | 0.10 | 0.02 |
| O | 0.50 | 0.18 | 0.09 |
| P | 0.86 | 0.70 | 0.61 |
| Q | 0.87 | 1.00 | 0.87 |
| R | 1.00 | 0.39 | 0.39 |
| S | 0.23 | 0.29 | 0.07 |

As demonstrated by the results tabulated above, the samples prepared using the aliphatic isocyanate-functionalized resin (i.e., sample formulations P, Q, and S) provided a much higher performance product than samples using aromatic resins.

Beneficially, prepreg composite reinforcement systems employing aliphatic isocyanate-functionalized resins provide many desirable qualities over typical epoxy resins or aromatic resins. For example, aliphatic resins have a longer shelf-life than aromatic resins. The longer shelf-life makes prepreg aliphatic-resin composite systems more economically feasible, as well as makes repairs more effective because the composite system does not lose much flexibility and effectiveness during storage. Additionally, aliphatic isocyanate-functionalized resins cure over longer periods of time than aromatic isocyanate-functionalized resins. In some embodiments, it takes several days for the aliphatic isocyanate-functionalized resin to cure versus several hours for aromatic isocyanate-functionalized resins to cure. Notably, this longer cure time allows for enhanced properties such as fewer voids within the cured resin and less mechanical strain created during the cure process.

Prepreg composite reinforcement systems employing aliphatic isocyanate-functionalized resins also provide for carrier benefits. For example, the thickness of plies of the carrier within a multi-plied carrier can be controlled. Additionally, plies of a multi-plied carrier may be individually saturated to provide generally uniform saturation of the carrier. Moreover, prepreg composite systems allow for use of additional carrier types. For example, prepreg composite systems can employ truly unidirectional carriers, whereas field-saturated epoxies must use crimped fabric.

Prepreg composite reinforcement systems employing aliphatic isocyanate-functionalized resins also provide benefits to users. For example, users can quickly and effectively apply the composite reinforcement system to a surface without the need to mix chemicals and wait for the carrier to become saturated. Further, the enhanced pliability of the prepreg system when applied to the surface provides for better coverage and a more-secure fit. Additionally, there is less risk of user error when using prepreg systems. The user does not have to mix chemicals, ensure homogeneity of the mixture, apply the chemicals, ensure saturation of the carrier, etc. This leads to increased mechanical performance and predictability of the composite reinforcement system. Further, the ratio of carrier to resin can be optimized to increase performance of the system, control desired mechanical properties, extend shelf life, and reduce cost of the system.

In some embodiments of the composite reinforcement system, it may be desirable for a carrier to be saturated with resin immediately prior to application to the surface to be reinforced (e.g., field-applied systems). Beneficially, the use of field-applied composite reinforcement systems having aliphatic isocyanate-functionalized resins provides for extended shelf life. Additionally, the use of the longer cure period of the aliphatic isocyanate-functionalized resins provides for additional time to allow the resin to saturate the carrier prior to application. The longer cure time also allows the carrier to be more flexible during application to the surface to be reinforced, yielding a more secure application and enhanced mechanical properties of the cured reinforcement.

Certain prepolymers, such as certain polyurethane prepolymers, include backbones formed using polyols with high concentrations of soft segments (e.g., polyether polyols). Indeed, prepolymers have been conventionally formed from polyols that are aliphatic throughout their backbone. When compared to epoxy-based composite reinforcement systems, composite reinforcement systems based on these prepolymers in the cured state may exhibit a lower modulus. A resin that exhibits a lower modulus in its cured state reduces the effectiveness of reinforcement provided by a composite reinforcement system when similar fabrics are used. Accordingly, specific prepolymers disclosed herein, such as specific polyurethane prepolymers, that are formed from a homogenous blend of reagents (e.g., homogenous blend of reagents 106) include hard segments within their backbones to strengthen the resulting prepolymer and, ultimately, the fully cured resin. Moreover, by impregnating the carrier 102a according to the process discussed above with respect to FIG. 1A, a more viscous prepolymer can be formed from the homogenous blend of reagents 106 than according to other methods, which allows for higher crosslinking in the resulting fully cured resin. Accordingly, the chemistry disclosed herein and the process of FIG. 1A allows for prepolymers used in composite reinforcement systems with higher crosslinking functionality, increased rigidity, a more unified backbone, and increased overall covalent and non-covalent interactions to increase the strength of the resulting composite reinforcement system.

To form prepolymers with higher crosslinking functionality, increased rigidity, and increased overall covalent and non-covalent interactions, isocyanates with increased functionality are reacted with polyols with hard segments in their backbones as at least two reagents within the homogenous blend of reagents 106. More specifically, with respect to the isocyanate, to increase the crosslinking functionality, isocyanates used in the homogenous blend of reagents include polyfunctional isocyanates. The polyfunctional isocyanates, when combined with a polyol to form the prepolymer, provide more isocyanate sites for crosslinking in the final cured resin. According to preferred aspects of the present disclosure, a polyfunctional isocyanate is used within the homogenous blend of reagents with an isocyanate functionality of greater than two to provide for a larger number of crosslinking cites in the final cured resin. Various isocyanates can be used that include a functionality of greater than two, such as, for example, polymeric methylene diphenyl diisocayanates, which is commercially available and used in different applications, such as for the manufacture of polyurethane foams, coatings, sealants, and elastomers. By way of example, and without limitation, according to preferred aspects of the disclosure, the polyfunctional isocyanate used in the homogenous blend of reagents to form the prepolymer is an isocyanurate-based polyfunctional isocyanate with a functionality greater than three. An isocyanurate-based polyfunctional isocyanate may be formed by trimerizing one or more isocyanates. For example, an isocyanurate-based polyfunctional isocyanate may be formed by trimerizing hexamethylene diisocyanate or a blend of hexamethylene diisocyanate and isophorone diisocyanate. In some aspects, the isocyanate may be an isocyanate with a % NCO of, for example, 20% to 32%. Various isocyanurate-based polyfunctional isocyanates can be used, such as, for example, isocyanurate-based polyfunctional isocyanates made or derived from hexamethylene diisocyanate and isophorone diisocyanate. However, other polyfunctional isocyanates with functionalities greater than two can be used, besides an isocyanurate-based polyfunctional isocyanate, without departing from the spirit and scope of the present disclosure. Further, the polyfunctional isocyanate with a functionality greater than two is preferably an aliphatic isocyanate for the reasons discussed above with respect to, for example, the production of carbon dioxide during the final curing process.

The concentration of the isocyanate in the homogenous blend of reagents 106 may vary depending on, for example, the specific reagents used, the specific non-reactive components included in the homogenous blend of reagents 106, the application of the resulting composite reinforcement system, etc. Relative to a total weight of the homogenous blend of reagents 106 used to impregnate the carrier 102, the amount of the isocyanate may be about 50 to 90 wt %. More specifically, the amount of the isocyanate may be about 55 to 75 wt %. The isocyanate may be a single isocyanate or a blend of multiple isocyanates. For example, the total concentration of isocyanate in the homogenous blend of reagents 106 may be from two or more isocyanates of equal or varying weight percentages to total between about 50 to 90 wt %.

By way of some specific examples, commercial embodiments of one or more of the above-described polyfunctional isocyanates include DESMODUR® N 3300A by Bayer MaterialScience LLC, DESMODUR® XP 2838 by Bayer MaterialScience LLC, DESMODUR® XP 2489 by Bayer MaterialScience LLC, and DESMODUR® W by Bayer MaterialScience LLC, to name a few examples.

To form prepolymers with increased rigidity and increased overall covalent and non-covalent interactions, polyols with hard segments in their backbones are reacted with the isocyanates in the previous paragraph, again as one of the at least two reagents within the homogenous blend of reagents 106. According to some preferred aspects of the present disclosure, polyols reacted with the isocyanate include a polyol containing one or more aromatic groups within the polyol's backbone, also referred to as an aromatic-group-containing polyol. According to even more preferred aspects, the polyol used in the homogenous blend of reagents 106 is a polyester-based aromatic-group-containing polyol. By way of example, and without limitation, a specific polyester-based aromatic-group-containing polyol used preferably contains polyester-based aromatic groups that allow for aromatic ring pi-pi stacking. Such an example of a polyester-based aromatic-group-containing polyol containing polyester-based aromatic groups that allow for aromatic ring pi-pi stacking is a polyethylene terephthalate-based polyol. Additional polyols that can be used as one of the at least two reagents in the homogenous blend of reagents include any one, or a combination thereof, of polycarbonate, polyester, polyamide, polyurethane, and polyurea groups containing polyols. More preferably, polycarbonate, polyester, polyamide, polyurethane, and polyurea groups containing polyols with aromatic groups in the backbone; and, even more preferably, with aromatic groups that allow for pi-pi stacking. In some aspects, polyols having lower equivalent weights are preferred. Such lower equivalent weight polyols include polyols having less than 1000 grams per mole, preferably less than 500 grams per mole, and most preferably less than 200 grams per mole.

By reacting a polyol, as described above in the preceding paragraph and that contain one or more aromatic groups in the backbone of the polyol, with a polyfunctional isocyanate, the resulting prepolymer exhibits, for example, higher crosslinking functionality and increased rigidity, which strengthens the resulting fully cured resin as compared to other prepolymers. Moreover, by specifically reacting polyfunctional aliphatic isocyanates with the above-described polyols, the resulting prepolymer exhibits the curing properties with respect to aliphatic isocyanates described above, such as with respect to the amount and rate of production of carbon dioxide, while also exhibiting the increased strength after the final cure as a result of the aromatic groups in the polyol that form the backbone of the prepolymer. Thus, although described generally as an aliphatic isocyanate-functionalized prepolymer, the prepolymer can contain aromatic moieties, such as in the backbone, while also containing aliphatic isocyanate functional groups. Although the prepolymer may contain aromatic groups within its backbone, the aliphatic isocyanate functional groups exhibit the increased performance with respect to the production of carbon dioxide gas described above as compared to aromatic isocyanate functional groups.

The concentration of the polyol in the homogenous blend of reagents 106 also may vary depending on, for example, the specific reagents used, the specific non-reactive components included in the homogenous blend of reagents 106, the application of the resulting composite reinforcement system, etc. Relative to a total weight of the homogenous blend of reagents 106 used to impregnate the carrier 102, the amount of the polyol may be about 5 to 50 wt %. More specifically, the amount of the polyol may be about 10 to 20 wt %. However, the amount of the polyol required may vary depending on several factors. For example, factors such as the equivalent weight percent of the isocyanate used, how much filler is used (discussed below), and the like may vary the total amount of polyol that is needed. Like the isocyanate, the polyol may be a single polyol or a blend of multiple polyols. For example, the total concentration of polyol in the homogenous blend of reagents 106 may be from two or more polyols of equal or varying weight percentages to total between about 5 to 50 wt %.

By way of some specific examples, commercial embodiments of one or more of the above-described polyols include STEPANPOL® PC-5020-160 by Stepan, which is an aromatic polyester polyol, has a viscosity of about 2,450 cPS at about 25° C., an average molecular weight of about 750, and a hydroxyl value of about 160 mgKOH/g; and XPEP1005-1.5 by Resinate Materials Group, and XPEP1005-2.5 by Resinate Materials Group, both of which are PET-based polyols.

In addition to the above isocyanates and polyols, the homogenous blend of reagents 106 can include other constituents, such as other non-reactive constituents, including additives or fillers for various other purposes. As described above, the homogenous blend of reagents 106 can include one or more catalysts as an additive. The catalysts can be for faster initial cure rates, such as the initial reaction of the reagents into the partially cured prepolymer, also referred to herein as the gelling reaction. Alternatively, or in addition, the catalysts can be for faster moisture cure rates for the eventual curing of the prepreg based on the addition of water, also referred to herein as the blowing reaction. By way of example, and without limitation, a catalyst for the gelling reaction can be dibutyltin dilaureate (DBDTL) and a catalyst for the blowing reaction can be one or more amines, such as dimethylethanolamine (DMEA). The catalyst DBDTL may also be for the blowing reaction. Specific for the blowing reaction, the catalyst can be one or more TOYOCAT® catalysts made by Tosoh Corporation. The amount of catalyst used for the blowing reaction can be, for example, 0 to 1 wt % of the total weight of the homogenous blend of reagents 106 that contains the catalyst. Various other catalysts can be used beyond the ones specifically mentioned herein without departing from the spirit and scope of the present disclosure.

The homogenous blend of reagents 106 may also include other non-reactive components, such as one or more fillers added to increase the hardness of the final resin after the blowing reaction. Such fillers provide a support matrix within the cured resin, in addition to the support matrix provided by the carrier, to further increase the strength of the final cured resin. The fillers include high aspect ratio materials, such as materials of a few microns to a few nanometers in size. By way of example, and without limitation, such fillers include wollastonite, halloysite, boron nitride, boron carbide, silicon carbide, tungsten carbide, aluminum oxide, chopped glass, fumed silica, and carbon nanotubes or carbon-fiber-based fillers, such as chopped carbon fibers, carbon nanotubes, and graphene, among other types of fillers. By way of some additional examples, specific commercial embodiments include EPOCYL™ 128-02, which is a liquid bisphenol-A (bis-A) epoxy resin containing a high concentration of carbon nanotubes; DRAGONITE-XR™, which is a halloysite clay; NANOMER® 1.28E, which is a modified montmorillonite mineral; SI-TUFF™ by Advanced Composite Materials, LLC, which is formed of silicon carbide; NYGLOS® 4W, which is a wollastonite-based filler; and W-610 ceramic microspheres made by 3M®. However, various other fillers can be used beyond the ones specifically mentioned herein without departing from the spirit and scope of the present disclosure.

The amount of filler in the homogenous blend of reagents 106 may vary depending on, for example, the additional non-reactive components included in the homogenous blend of reagents 106, the application of the resulting composite reinforcement system, the specific type of filler, etc. Relative to a total weight of the homogenous blend of reagents 106, the total amount of filler may be about 0.1 to 35 wt %. Like the isocyanate and the polyol, the filler may be one filler or a blend of multiple fillers. For example, the total amount of filler in the homogenous blend of reagents 106 may be from two or more fillers of equal or varying amounts to total between about 0.1 to 35 wt %. In some aspects, and depending on the specific chemistry of the homogenous blend of reagents 106, including the filler(s), the amount of the filler may be about 10 to 30 wt % of the homogenous blend of reagents 106.

The homogenous blend of reagents 106 may have other active ingredients, besides the isocyanate and the polyol, that react to form the final cured resin. By way of example, and without limitation, the homogenous blend of reagents 106 can include additional reagents to form an interpenetrating polymer network with the polymer network formed by the isocyanate and polyol reagents. Such interpenetrating networks improve the modulus of the final resin in various types of polymer systems. By way of example, and without limitation, the incorporation of either copolymer highly functionalized polyurethane acrylates into the homogenous blend of reagents describe above, that would have a thermal radical polymerization step, would implement a dual-cure system in the partially cured and fully cured resin. Alternatively, or in addition, functionalized epoxies that undergo ring opening and that would attack the isocyanates could also be added to the homogenous blend of reagents. Such functionalized epoxies would form a dual-cure polymer network with the polymer network formed from the isocyanate and polyol reagents.

Additional additives (e.g., reactive and non-reactive constituents) to the homogenous blend of reagents 106 can include, for example, silica, a de-foaming surfactant, a hindered amine chain extender, or a hydroxy ethyl oxazolidine intermediate to alter additional properties of the prepolymer of the fully cured resin. In some embodiments, the altered property is the viscosity of the prepolymer or the thixotropy of the prepolymer. For example, fumed silica can be added to a homogenous blend of reagents used to form an aliphatic isocyanate-functionalized prepolymer to alter or increase the thixotropy of the resulting mixture including the prepolymer. The addition of fumed silica increases the viscosity of the prepolymer mixture under low shear rates and lowers the viscosity at higher shear rates. In some embodiments, an additive can further reduce the amount of gas generated during the curing process. For example, a hindered amine chain extender reduces the percentage of NCO in the prepolymer, which reduces the amount of carbon dioxide generated during curing. The de-foaming surfactant additive in addition can collapse any foam that might form reducing the void content of the final composite. An amount of de-foaming surfactant added to the homogenous blend of reagents 106 can be about 0 to 1 wt % relative to the total weight of the homogenous blend of reagents 106. Specific de-foaming surfactants include, for example, one or more interface actives made by OMG Borchers, such as BORCHI® Gol 0011, BORCHERS® AF 0670, and BORCHERS® AF 1171, which is a modified polysiloxane flow and air release agent. Additional surfactants include, for example, ELEMENT14™ PDMS 12.5K and ELEMENT14™ PDMS 60K, which are silicones produced by MOMENTIVE™, FF160 and FF170, which are fluorosilicones by MOMENTIVE™, and TEGO® Foamex and TEGO® Airex de-foamers and/or de-areators by Evonik Industries. In some embodiments, the additive reduces the rate of gas generation during curing. For example, a hydroxy ethyl oxazolidine intermediate reacts with water to generate amines and alcohols, diverting the water from reacting with the isocyanate groups. These amines and alcohols then react with the isocyanate groups to complete the cure. However, various other additives can be used beyond the ones specifically mentioned herein without departing from the spirit and scope of the present disclosure.

A prepreg formed from the reagents and components described above can be formed according to various techniques and methods, such as the method described above with respect to FIGS. 1A and 1B. However, various other techniques can be used, such as a hand layup method and the like. Each reagent or component may be added separately to the homogenous blend of reagents 106. Alternatively, one or more of the reagents or components can be premixed prior to being mixed in the final homogenous blend of reagents 106. By way of example, and without limitation, the isocyanate can be premixed with the filler as one pre-blend (e.g., pre-blend A) prior to forming the homogenous blend of reagents 106. Additionally, the polyol and one or more of the other additives can be premixed as another pre-blend (e.g., pre-blend B) prior to forming the homogenous blend of reagents 106. For example, the polyol can be premixed with one or more catalysts (e.g., gelling catalyst(s) and/or blowing catalyst(s)), the de-foaming surfactant, or a combination thereof as the second pre-blend. The two pre-blends are then mixed together, such as according to the process described above in FIGS. 1A and 1B to form the homogenous blend of reagents 106.

Figure 2A:
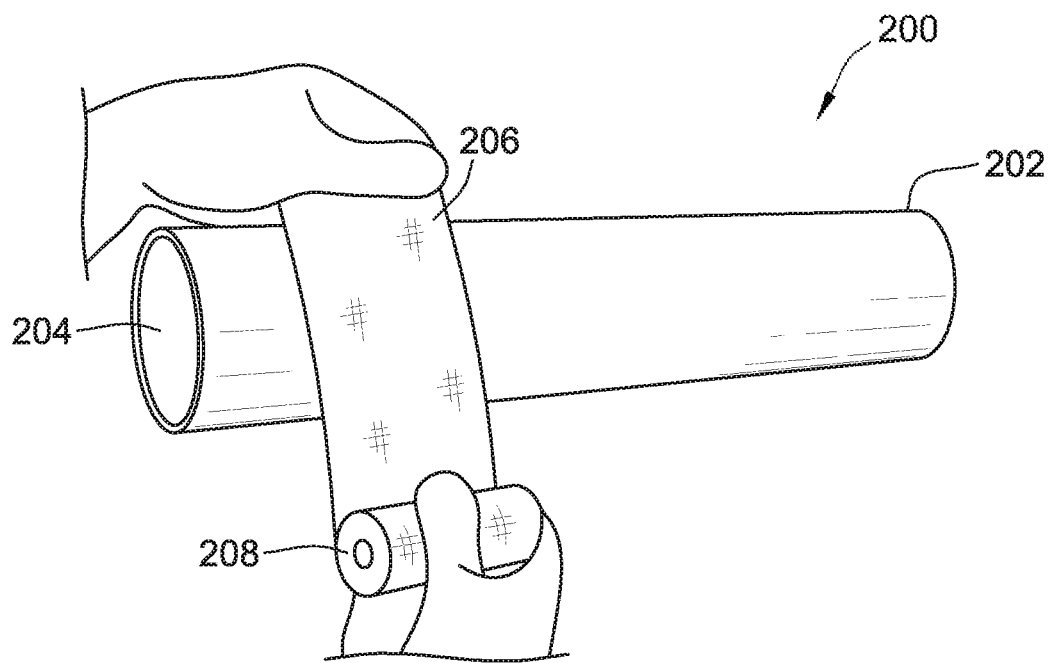
FIG. 2A shows a perspective view of the application of a composite reinforcement system to a physical structure to be reinforced, in accord with aspects of the present disclosure.
Figure 2B:
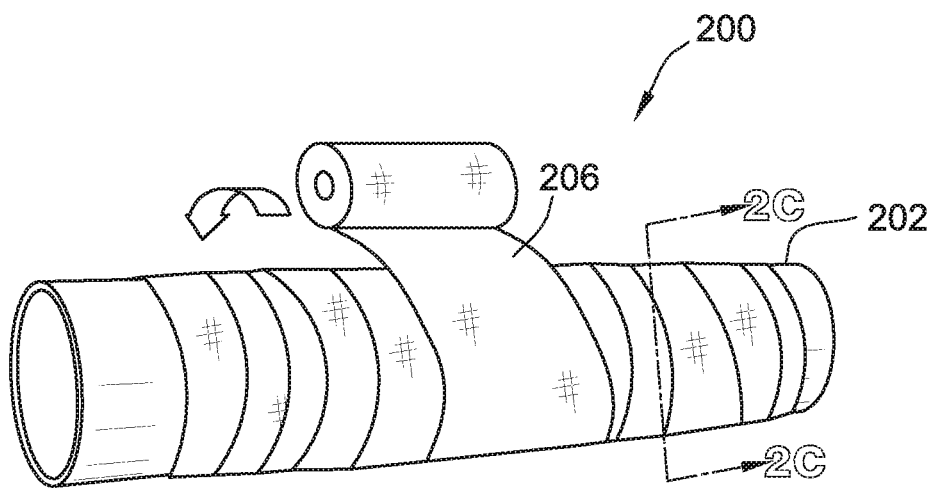
FIG. 2B shows a perspective view of a nearly finished application of the composite reinforcement system of FIG. 2A, in accord with aspects of the present disclosure.
Figure 2C:
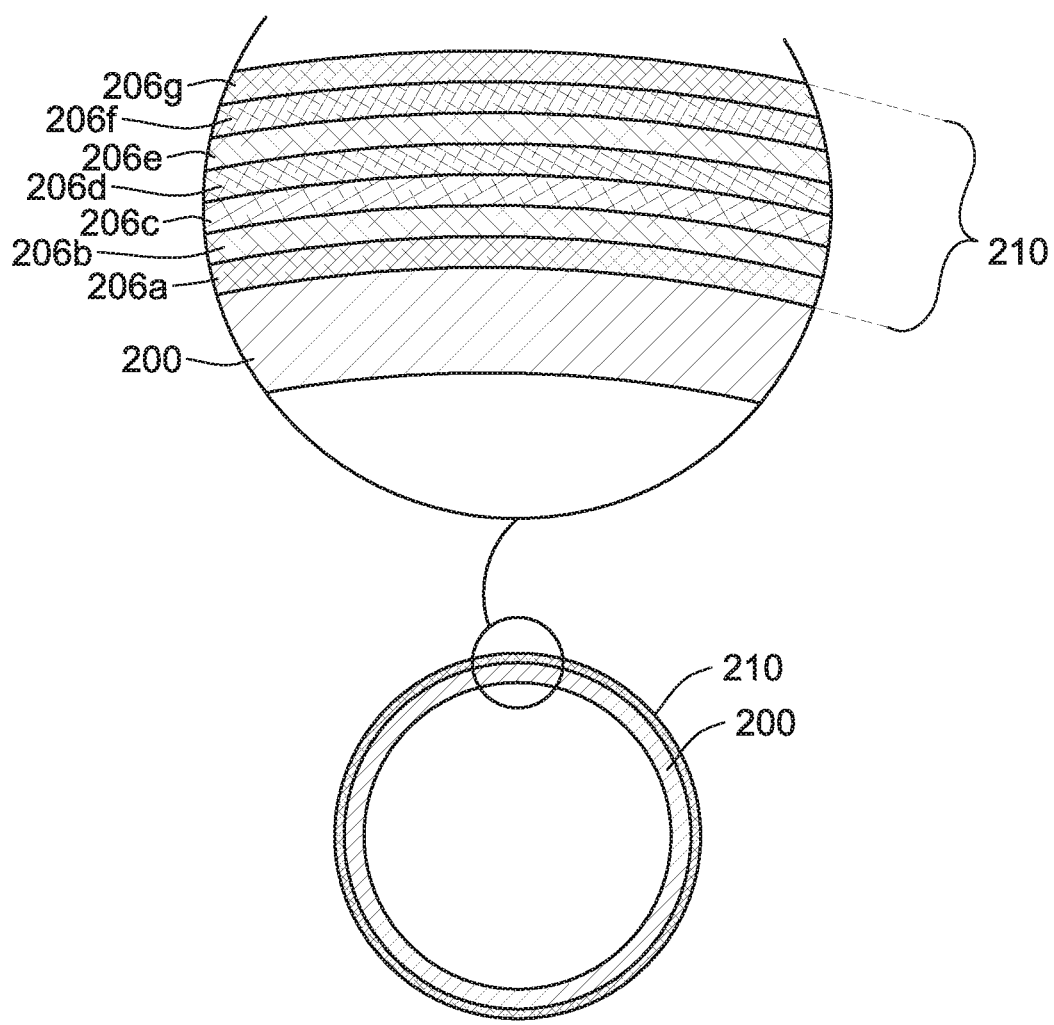
FIG. 2C shows a cross-sectional view of the physical structure and applied composite reinforcement system along the line 2C-2C in FIG. 2B, in accord with aspects of the present disclosure.
Figure 4A:
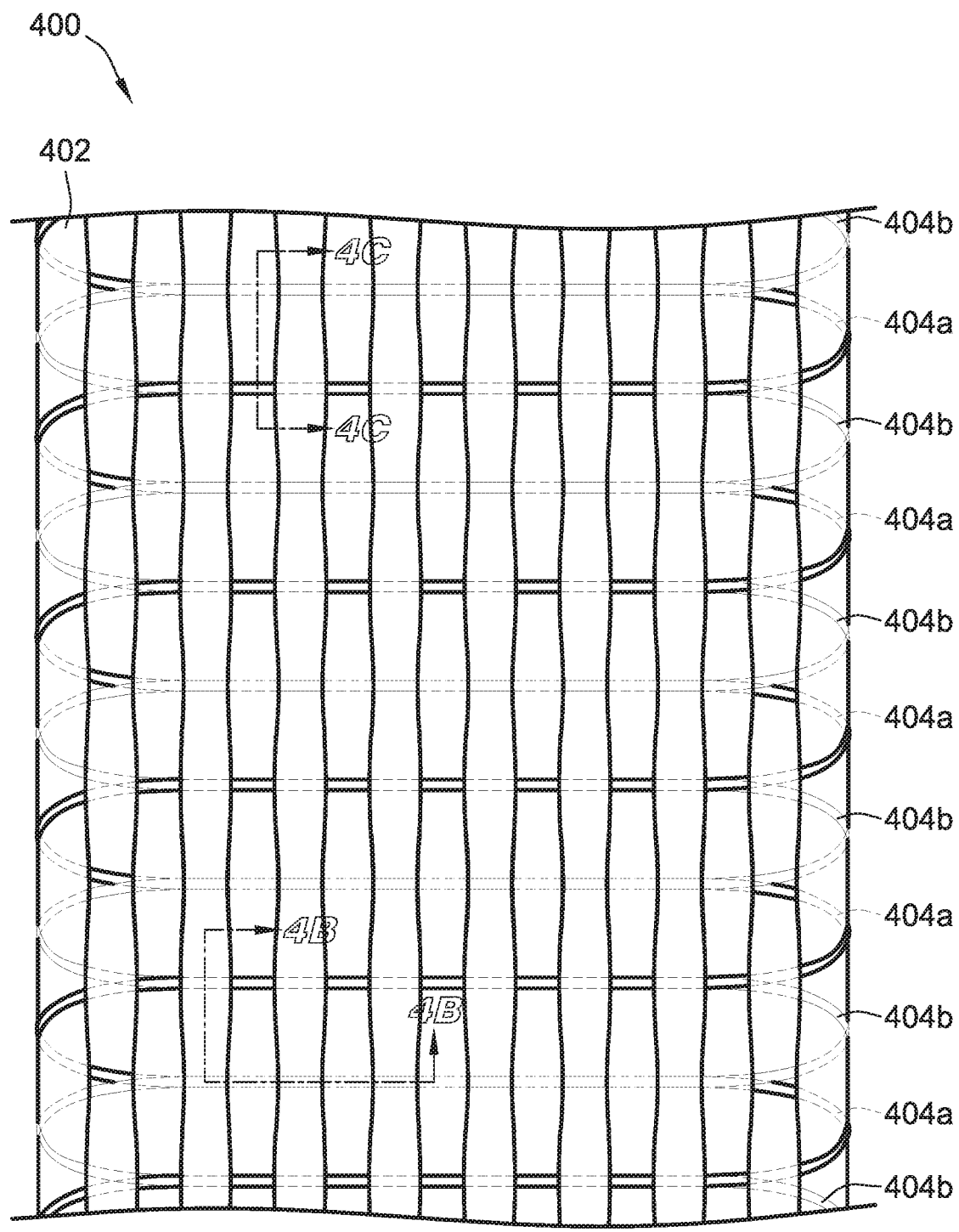
FIG. 4A shows a plan view of an additional carrier of a composite reinforcement system, in accord with aspects of the present disclosure.
Figure 4B:
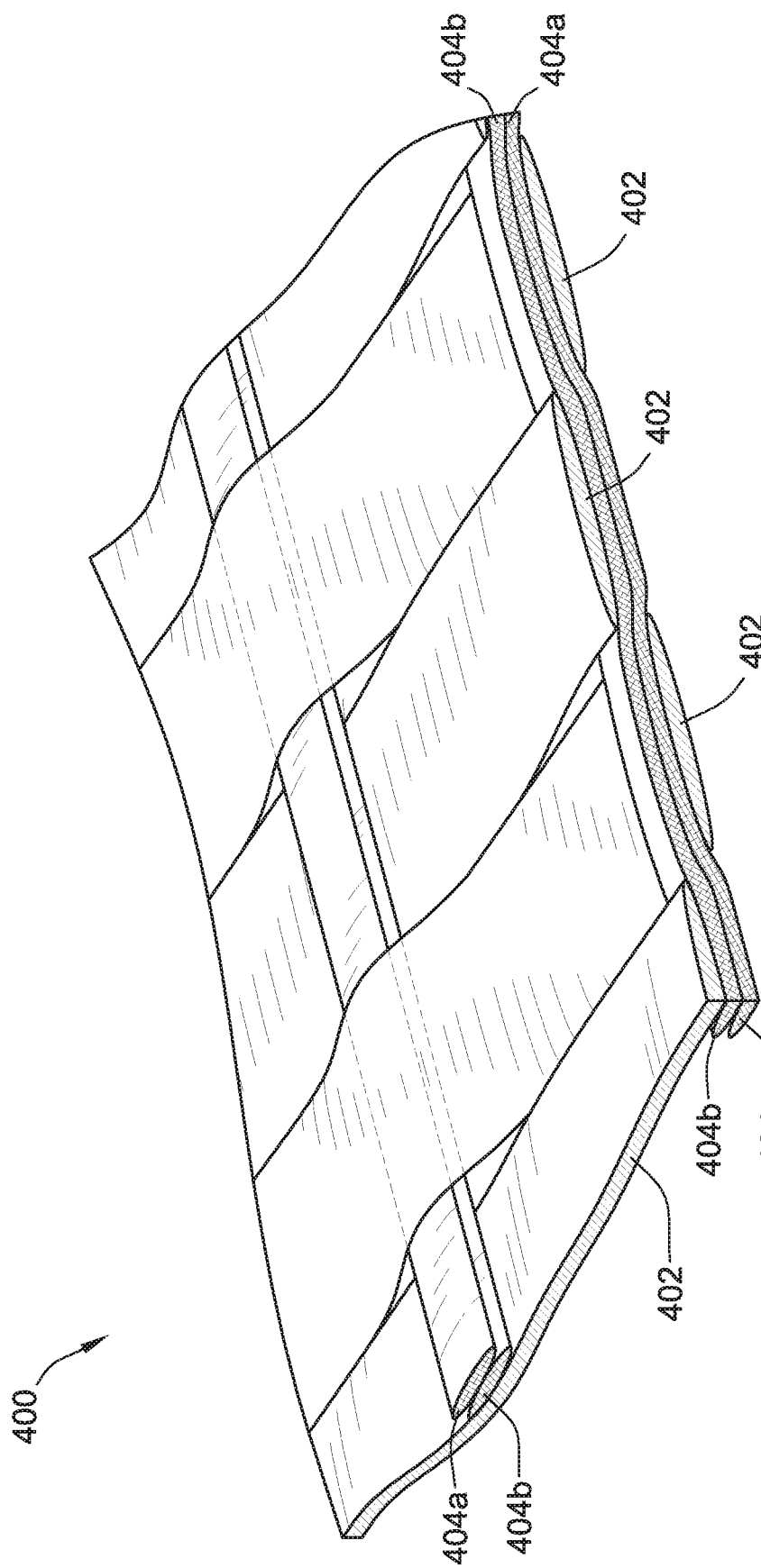
FIG. 4B shows a cut-out perspective view of the carrier of FIG. 4A along the line 4B-4B in FIG. 4A, in accord with aspects of the present disclosure.

Referring now to the drawings, FIGS. 2A-2C illustrate various views of an exemplary composite reinforcement system applied to a structure, in accord with aspects of the present disclosure. FIG. 3 illustrates another exemplary aspect of a composite reinforcement system, in accord with aspects of the present disclosure. FIGS. 4A-4C illustrate another carrier for use in a composite reinforcement system, in accord with aspects of the present disclosure.

FIG. 2A is a perspective view of an exemplary physical structure 200 showing a composite reinforcement system initially being applied to reinforce an exterior surface of a section of the physical structure. Although the physical structure 200 is shown as a pipe, the present disclosure is applicable to various other physical structures. Such various other physical structures include, for example, conduit assemblies, such hydraulic circuits, containment structures, such as storage tanks, and load bearing structures, such as beams and concrete columns or pillars. Moreover, a physical structure 200 to be reinforced may be constructed of any feasible material having sufficient strength and resiliency for the intended use of the physical structure 200. By way of example, and without limitation, the physical structure 200 is fabricated from a material that can withstand significant internal and external loading, such as those that exist by reason of surrounding formations (e.g., when the physical structure 200 is buried underground), as well as any additional loads exacted thereto (e.g., due to internal fluid pressures, existing constructions, varying surface loads, etc.).

The physical structures (e.g., physical structure 200) may require reinforcement and/or repair for various different reasons. According to one reason, a physical structure may require reinforcement and/or repair based on flaws within the structure. Such flaws may be the result of production flaws, such as the separation of two laminated layers, cracks, dents, gouges, wrinkles, or combinations thereof formed within the initial materials used to form the physical structures. Such flaws may also be the result of other types of manufacturing flaws, such as flaws within material used to fasten two elements of the physical structure together, such as welding related flaws. The welding related flaws may be, for example, lack of penetration of the weld, lack of fusion within the weld, and/or porosity of the resulting weld. Such flaws may also be the result of incorrect materials being used during the construction of a physical structure. For example, a faulty material selection and/or inadvertent or incorrect substitution of materials may lead to flaws within the final physical structure that request reinforcement.

According to another reason for reinforcement or repair, physical structures deteriorate over time as a result of various factors (e.g., wind, rain, snow, temperature changes, humidity, corrosion, erosion, etc.). For example, metallic physical structures can suffer from general metal loss due to corrosion and/or erosion. Certain areas of metallic physical structures may suffer from greater erosion and/or corrosion, or may have areas with specific corrosion and/or erosion rates. Metallic structures may also have localized metal loss due to corrosion and/or erosion, such as corrosion under insulation (CUI), pitting, and selective corrosion. Deterioration also results in cracking, such as surface cracks (e.g., stress corrosion cracking (SCC)). The composite reinforcement structures disclosed herein can be used to reinforce and/or repair the deterioration of the physical structures over time.

As discussed above, certain structures are covered by laws and/or regulations that define rules, constraints, and/or parameters within which the physical structures must comply. Alternatively, or in addition, certain physical structure previously not covered by laws and/or regulations may subsequently be covered to address increased performance of the physical structures. For example, physical structures may be associated with classification factor changes, which define the risk associated with an accident based on a surrounding population density. With respect to roadways, the roadways may be associated with road crossing reinforcements. For example, if the amount of traffic or weight of traffic changes over a below ground pipe, the strength of the pipe must be increased to resist the increase load or traffic weight. The composite reinforcement structures disclosed herein can be used to have existing physical structure comply with changes in the laws and regulations application to such structures.

Steel is one example of a specific material that is commonly found in physical structures. Despite its strength and resilience, steel physical structures may require reinforcement and/or repair. For example, steel physical structures in the form of load bearing and/or support structures, such as beams, trusses, tanks, decks, hulls, towers, and poles, may require reinforcement and/or repair for any one or more of the reasons discussed above. In certain applications, the performance of a steel physical structure may be required to be improved without replacing the physical structure, such as stiffening the physical structure or increasing the load bearing capacity of the physical structure. Alternatively, a reduction in weight of a steel physical structure may be required without a corresponding loss in the performance of the steel physical structure. In one or more of these applications, the composite reinforcement systems of the present disclosure can be used to reinforce and/or repair such steel physical structures.

In the illustrated embodiment, the physical structure 200 includes elongated hollow steel cylinders having an exterior surface 202 and an interior surface 204 that may be reinforced or repaired with a composite reinforcement system. Alternatively, the exemplary pipes illustrating the exemplary physical structure 200 can also be fabricated from other metallic and polymeric materials. Moreover, although illustrated as cylindrical components, the physical structure may take on other geometric cross-sections that allow for the application of a composite reinforcement system to a curved metallic structure (e.g., an elliptical cross-section) without departing from aspects of the present disclosure. Additional structures and geometries that the described composite reinforcement system may be applied to include steel columns (e.g., flange, hollow tube, hollow square, hollow rectangular cross-sections); concrete columns (e.g., circular, oval, square, rectangular cross-section); concrete or steel beams; other load bearing structures made of steel, wood, or concrete; storage tanks; concrete walls; and/or concrete slabs. References to concrete structures include both reinforced and unreinforced concrete structures.

A composite reinforcement system, including an impregnated carrier 206 impregnated with a resinous material as described herein, for the reinforcement or repair of the physical structure 200 is shown in accordance with aspects of the present disclosure. The impregnated carrier 206 may be stored in the form of a prepreg roll 208. The carrier 206 is initially applied to the physical structure 200 by applying a first end of the prepreg roll 208 to the physical structure 200, as illustrated in FIG. 2A, and then wrapping the roll 208 around the structure such that a series of multiple thin layers of the carrier 206 are applied about the physical structure 200 (e.g., about the exterior 202 or the interior 204).

A near-finished application of a composite reinforcement system with the last outermost exposed layers of the carrier 206 is illustrated in FIG. 2B, with a cross-section through the physical structure illustrated in FIG. 2C. As shown in the exploded view of FIG. 2C, overlapping layers 206a-206g of the carrier 206 applied to the physical structure 200 form a multilayered structure 210. Each of the overlapping carrier layers 206a-206g has a generally uniform thickness. In some embodiments, the thickness of each layer 206a-206g increases by less than 10% during curing. Preferably, the thickness of each layer 206a-206g increases less than 5% during curing. More preferably, the thickness of each layer 206a-206g increases less than 1% during curing.

In some embodiments, a material to initiate or aid in curing is applied to the surface (e.g., exterior 202 or the interior 204) of the physical structure 200. For example, the surface is wetted to initiate curing of the aliphatic isocyanate-functionalized resin when the first layer of the carrier 206 (e.g., layer 206a) contacts the wet surface. The carrier 206 is then applied to the structure in layers (e.g., layers 206b-206g) as described above, but the material to initiate or aid in curing is generally applied to the outer portion of each layer prior to the application of the next layer of the composite reinforcement system.

Employing an aliphatic resin can desirably allow a user to apply a desired number of layers over a longer period of time than aromatic resins or epoxies. In some embodiments, the layers are applied in about ten minutes prior to the end of the wrapping procedure or the application of compression to the composite reinforcement system. In some embodiments, the layers are applied for more than about five minutes prior to the end of the wrapping procedure or the application of compression to the composite reinforcement system. In some embodiments, the layers are applied for more than about ten minutes prior to the end of the wrapping procedure or the application of compression to the composite reinforcement system. In some embodiments, the layers are applied for more than about fifteen minutes prior to the end of the wrapping procedure or the application of compression to the composite reinforcement system. In some embodiments, the layers are applied for more than about twenty minutes prior to the end of the wrapping procedure or the application of compression to the composite reinforcement system. In some embodiments, the layers are applied for more than about thirty minutes prior to the end of the wrapping procedure or the application of compression to the composite reinforcement system. In some embodiments, the layers are applied for more than about forty-five minutes prior to the end of the wrapping procedure or the application of compression to the composite reinforcement system. In some embodiments, the layers are applied for more than about sixty minutes prior to the end of the wrapping procedure or the application of compression to the composite reinforcement system. In some embodiments, the layers are applied for more than about ninety minutes prior to the end of the wrapping procedure or the application of compression to the composite reinforcement system. In some embodiments, the layers are applied for more than about 120 minutes prior to the end of the wrapping procedure or the application of compression to the composite reinforcement system. In some embodiments, the layers are applied for more than about 180 minutes prior to the end of the wrapping procedure or the application of compression to the composite reinforcement system. In some embodiments, the layers are applied for more than about 240 minutes prior to the end of the wrapping procedure or the application of compression to the composite reinforcement system.

FIG. 3 illustrates a multi-ply composite reinforcement system 300 for reinforcing physical structures in accordance with aspects of the present invention, in accord with aspects of the present concepts. The composite reinforcement system 300 includes four layers 302a-302d of uni-directional fibers as the carrier. As shown, the layer 302a includes the uni-directional fibers extending in a first direction generally (e.g., left to right in the perspective shown in FIG. 3. The layer 302b immediately above and touching the layer 302a includes the uni-directional fibers extending in a direction rotated 45 degrees counterclockwise relative to the view in FIG. 3 and with respect the direction of the uni-directional fibers of layer 302a. The same pattern is repeated for each additional layer added above layers 302a and 302b. Namely, the layer 302c immediately above and touching the layer 302b includes the uni-directional fibers extending in a direction rotated 45 degrees counterclockwise relative to the view in FIG. 3 and with respect the direction of the unidirectional fibers of layer 302b. The layer 302d immediately above and touching the layer 302c includes the uni-directional fibers extending in a direction rotated 45 degrees counterclockwise relative to the view in FIG. 3 and with respect to the direction of the uni-directional fibers of layer 302c.

The hardened single-ply of a uni-directional fiber has a thickness of less than 1/16 of an inch. In some aspects, a multi-ply composite reinforcement system has a thickness of less than or equal to about 100 mils, less than or equal to about 50 mils, less than or equal to about 25 mils, less than or equal to about 15 mils, less than or equal to about 10 mils, less than or equal to about 5 mils, between the range of about 50 to 100 mils, between the range of about 25 to 50 mils, between the range of about 10 to 25 mils, and/or between the range of about 5 to 10 mils.

FIG. 4A illustrates an alternative carrier 400 for reinforcing physical structures as part of a composite reinforcement system, in accord with aspects of the present concepts. The carrier 400 is a bi-axial, carbon fiber and fiberglass composite material. Specifically, the carrier 400 is formed of carbon fibers 402 that extend generally in the 0 degree direction and fiberglass fibers 404a, 404b that extend generally in the 90 degree direction, perpendicular to the carbon fibers 402. In some aspects, the 0 degree direction is relative to the warp or length of the carrier 400, such as being the longest dimension of the carrier 400, and the 90 degree direction is relative to the weft or width of the carrier 400. In alternative aspects, the 0 degree and 90 degree directions are unrelated to the dimensions of the carrier 400 and are instead merely to identify the relationship between the orientation of the carbon fibers and the fiber glass fibers. For example, a carrier within a composite reinforcement system may be cut from the carrier 400 according to various shapes and/or sizes and subsequently packaged, such that the carrier 400 is stock material, and the directions in which the carbon fibers 402 and fiberglass fibers 404a, 404b extend (e.g., 0 degrees and 90 degrees) may vary relative to the length and width of the carrier 400.

At the edges of the carrier 400, the fiberglass fibers 404a, 404b loop over the outermost carbon fibers 402. However, one or more carriers may be cut from the carrier 400 such that the edges of the resulting carrier do not include fiberglass fibers 404a, 404b looping over the outmost carbon fibers 402. For example, the carrier 400 in FIG. 4A may be an initial stock material from which carriers used in composite reinforcement systems are cut from.

In addition to the orientation of carbon fibers 402 extending generally in the 0 degree direction and the orientation of the fiberglass fibers 404a, 404b extending generally in the 90 degree direction, the fiber distribution is at least about 70 wt % in the 0 degree direction and at most about 30 wt % in the 90 degree direction, relative to a total weight of the carrier 400. In some aspects, the fiber distribution is about 80 wt % in the 0 degree direction and about 20 wt % in the 90 degree direction, relative to a total weight of the carrier 400. In some aspects, the fiber distribution is about 85 wt % in the 0 degree direction and about 15 wt % in the 90 degree direction, relative to a total weight of the carrier 400. In some aspects, the fiber distribution is about 90 wt % in the 0 degree direction and about 10 wt % in the 90 degree direction, relative to a total weight of the carrier 400. In some aspects, the fiber distribution is about 95 wt % in the 0 degree direction and about 5 wt % in the 90 degree direction, relative to a total weight of the carrier 400. In some aspects, the fiber distribution is about 97 wt % in the 0 degree direction and about 3 wt % in the 90 degree direction, relative to a total weight of the carrier 400. In some aspects, the fiber distribution is about 99 wt % in the 0 degree direction and about 1 wt % in the 90 degree direction, relative to a total weight of the carrier 400. The resulting carrier 400 has a weight of about 500 to about 610 grams per square meter.

Referring to FIGS. 4B and 4C, FIG. 4B shows a cut-out perspective view of the carrier of FIG. 4A along the line 4B-4B, and FIG. 4C shows a cross-sectional view of the carrier of FIG. 4A along the line 4C-4C, in accord with aspects of the present disclosure. As shown, the fiberglass fibers 404a, 404b are woven between the carbon fibers 402 such that the fiberglass fibers 404a, 404b alternatingly cross over and under the carbon fibers 402 as the fiberglass fibers 404a, 404b extend across the carrier 400. However, the particular weave of the carrier 400 may vary without departing from the spirit and scope of the present disclosure. For example, the fiberglass fibers 404a, 404b may alternatingly cross over and under every two or more carbon fibers 402 as the fiberglass fibers 404a, 404b extend across the carrier 400. Further, although the carrier 400 is described as the fiberglass fibers 404a, 404b alternatingly crossing over and under the carbon fibers 402, instead the carrier 400 may be considered as the carbon fibers 402 crossing over and under the fiberglass fibers 404a, 404b.

As shown in FIGS. 4A-4C, there are two fiberglass fibers 404a, 404b. In some aspects, the fiberglass fibers 404a, 404b are woven between the carbon fibers 402 with each fiberglass fiber 404a, 404b alternating as the top fiberglass fiber. For example, as shown in FIG. 4B, fiberglass fiber 404b is initially above fiberglass fiber 404a, as shown in the lower right cross-sectional portion, as the fiberglass fibers 404a, 404b extend across the carrier 400. In the subsequent weave of the fiberglass fibers 404a, 404b through the carbon fibers 402, fiberglass fiber 404a is above fiberglass fiber 404b. The pattern of alternating top fiberglass fibers continues through the carrier 400. However, alternatively, the same fiberglass fiber 404a or 404b may be the top fiberglass fiber throughout the carrier 400. Further, although FIGS. 4A-4C show two fiberglass fibers 404a, 404b, the carrier 400 may instead include one or more fiberglass fibers, such as only one fiberglass fiber that is woven through the carrier 400, or three or more fiberglass fibers that are woven through the carrier 400.

The fiberglass fibers 404a, 404b may be conventional fiberglass fibers. However, the weight, the strength, the modulus, and/or the density of fiberglass fibers 404a, 404b may vary depending the specific use and/or physical structure to be repaired or replaced.

The carbon fibers 402 may be PAN and pitch-based carbon fibers. Further, the carbon fibers 402 may be, for example, about 5,000 to about 50,000 carbon fiber tows. In some aspects, the carbon fibers 402 are formed of a 3,000 carbon fiber tow, a 6,000 carbon fiber tow, a 9,000 carbon fiber tow, a 12,000 carbon fiber tow, a 16,000 carbon fiber tow, a 20,000 carbon fiber tow, a 30,000 carbon fiber tow, or a 50,000 carbon fiber tow. In some aspects, a larger carbon fiber tow to is desired for the carbon fibers 402 to produce a thicker carrier that more closely matches the thickness of the physical structure being repaired. In some aspects, each of the carbon fibers 402 within the carrier 400 are the same type (e.g., PAN versus pitch) and the same weight and/or thickness (e.g., tow). Alternatively, the carbon fibers 402 within the carrier 400 may vary such that the carbon fibers are different types and/or weights or thicknesses.

The carbon fibers 402 may be conventional fiberglass fibers. However, the weight, the strength, the modulus, and/or the density of carbon fibers 402 may vary depending the specific use and/or physical structure to be repaired or replaced. Moreover, the weight, strength, modulus, and/or density of carbon fiber 402 may also vary depending on the characteristics of the fiberglass fibers 404a, 404b.

Referring back to the chemistry of a moisture-curable prepolymer, a benefit of a composite reinforcement system using aliphatic isocyanate-functionalized resin is a high-stiffness and high-strength reinforcement system that minimizes the overall thickness of the reinforced or repaired structure, even for applications where multiple layers of the composite reinforcement system are applied to the portion of the structure being reinforced. For example, the strength increase provides for lower overall thickness (e.g., fewer wraps) needed to soundly repair a structure. Additionally, a benefit of a composite reinforcement system using aliphatic isocyanate-functionalized resin is the ability to use thicker overall multi-ply composites without encountering issues such as delamination of the plies. For example, the thicker multi-ply composites lower the number of wraps that need to be applied to soundly repair a structure. Beneficially, fewer required wraps also reduces the cost of labor to soundly repair a structure. Moreover, according to the above-described chemistry, the resulting prepolymer formed from the homogenous blend of reagents 106 can maintain a substantially constant thickness from the initial formation of the prepreg to the finally cured product. Further, the above-described chemistry allows for a substantially constant thickness without the need for high temperatures and pressures (e.g., use of an autoclave) to achieve the final product.

The benefits of the chemistry of the resinous material with, for example, higher crosslinking described herein, and with respect to impregnating the carrier with a homogenous blend of reagents to form the prepolymer, are illustrated through samples that were prepared and tested to determine the performance compared to other composite reinforcement systems. That is, as a measure of performance of a composite reinforcement system formed according to the concepts disclosed herein, such composite reinforcement systems were prepared with different formulations of the homogenous blend of reagents 106 and based on the method identified above with respect to FIG. 1A. The carrier for each composite reinforcement system was a uniaxial carbon fiber held together by a hotmelt fabric. Specifically, the carrier used is commercially available as Neptune Research Inc.'s Titan™-118 carbon fiber uni-directional fabric with primary continuous fibers oriented in the 0° direction.

Each composite reinforcement system was measured according to its transverse modulus, which is defined as the modulus measured in the direction perpendicular to the principal axis of the fibers. When a transverse modulus is measured for a system that is predominantly uniaxial fibers, the inherent modulus of the cured resin is tested. Superior composite reinforcement systems and, therefore, superior resin systems, are identified as those systems whose transverse modulus is greater, with the best system having the highest transverse modulus.

TABLE 1

| Reagent | | | Formulation No. | | | | | | | | | | | |
|---|---|---|---|---|---|---|---|---|---|---|---|---|---|---|
| | Designation | Commercial Name | 1 | 2 | 3 | 4 | 5 | 6 | 7 | 8 | 9 | 10 | 11 | 12 |
| Isocyanate | Isocyanate 1 | DESMODUR ® N3300A | 72.6 | 80.6 | | | | | | | | | | |
| | Isocyanate 2 | DESMODUR ® XP2838 | | | 73.7 | 81.8 | | | | 31 | 60.6 | | 56 | |
| | Isocyanate 3 | DESMODUR ® XP2489 | | | | | 73.7 | 81.8 | | | | 60.6 | | |
| | Isocyanate 4 | DESMODUR ® W | | | | | | | | 31 | | | | 60.5 |
| | Isocyanate 5 | PAPI 94 | | | | | | | 70.2 | | | | | |
| Polyol | Polyol 1 | STEPANPOL ® PC-5020-160 | | | | | | | | | 39.4 | 39.4 | | |
| | Polyol 2 | XPEP1005-1.5 | 27.4 | 19.4 | 26.3 | 18.2 | 26.3 | 18.2 | 29.8 | 38 | | | | 39.5 |
| | Polyol 3 | XPEP1005-2.5 | | | | | | | | | | | 44 | |
| | | Total wt % | 100 | 100 | 100 | 100 | 100 | 100 | 100 | 100 | 100 | 100 | 100 | 100 |
| | | % NCO of the System | 8 | 12 | 8 | 12 | 8 | 12 | 12 | 8 | 8 | 8 | 8 | 8 |

TABLE 2

| Reagent Designation | Commercial Name | Formulation No. | | | | | | | | | | | | | | |
|---|---|---|---|---|---|---|---|---|---|---|---|---|---|---|---|
| | | 13 | 14 | 15 | 16 | 17 | 18 | 19 | 20 | 21 | 22 | 23 | 24 | 25 | 26 | 27 |
| Isocyanate | Isocyanate 1 | DESMODUR ® N3300A | | | | | | | | | 67.1 | 68.2 | 68.2 | 64.8 | 68.2 | 68.2 | |
| | Isocyanate 2 | DESMODUR ® XP2838 | 54.5 | 68.2 | 68.2 | 75 | 78.5 | 68.2 | 68.2 | 68.2 | | | | | | | |
| | Isocyanate 3 | DESMODUR ® XP2489 | | | | | | | | | | | | | | | |
| | Isocyanate 4 | DESMODUR ® W | | | | | | | | | | | | | | | 55.9 |
| | Isocyanate 5 | PAPI 94 | | | | | | | | | | | | | | | |
| Polyol 2 | | XPEP1005-1.5 | 12.2 | 15.1 | 15.1 | 16.7 | 17.5 | 15.1 | 15.1 | 15.1 | 16.2 | 15.1 | 15.1 | 14.4 | 15.1 | 15.2 | 27.4 |
| Filler | | Chopped Carbon Fiber | 33.3 | 16.7 | | | | | | | | | | | | | |
| | | EPOCYL ™ I.28-02 | | | 16.7 | | | | | | | | | | | | |
| | | Fumed Silica | | | | 8.3 | 4 | | | | | | | | | | |
| | | DRAGONITE-XR ™ | | | | | | 16.7 | | | | | | | | | |

TABLE 2-continued

| Reagent Designation | Commercial Name | \multicolumn{15}{c}{Formulation No.} | | | | | | | | | | | | | | |
|---|---|---|---|---|---|---|---|---|---|---|---|---|---|---|---|
| | | 13 | 14 | 15 | 16 | 17 | 18 | 19 | 20 | 21 | 22 | 23 | 24 | 25 | 26 | 27 |
| | NANOMER ® 128E | | | | | | | 16.7 | | | | | | | | |
| | Chopped Glass Fiber | | | | | | | | 16.7 | 16.7 | | | | | | |
| | Boron Nitride | | | | | | | | | | 16.7 | | | | | |
| | NYGLOS ® 4W | | | | | | | | | | | 16.7 | 20.8 | | 8.3 | 16.7 |
| | W-610 | | | | | | | | | | | | | 16.7 | 8.3 | |
| | Total wt % | 100 | 100 | 100 | 100 | 100 | 100 | 100 | 100 | 100 | 100 | 100 | 100 | 100 | 100 | 100 |
| | % NCO of the System | 8 | 10 | 10 | 11 | 11.5 | 10 | 10 | 10 | 10 | 10 | 10 | 9.5 | 10 | 10 | 10 |

Table 1 above lists various formulations of exemplary homogenous blends of reagents (e.g., homogenous blends of reagents 106) that were prepared for comparison and that include only isocyanates and polyols within the blend. Table 2 above lists formulations of homogenous blends of reagents (e.g., homogenous blends of reagents 106), similar to the reagents used in Table 1, but that include fillers dispersed within the blend. The formulations in Tables 1 and 2 were prepared by mixing the listed reagents and fillers using a FlackTek Inc. SPEEDMIXER™. As discussed in detail below and shown in the tables, the various formulations were formed using different isocyanates, in addition to different percent % NCO for the resulting partially cured prepolymer, as well as differing polyols and fillers (for Table 2).

Referring to Table 1, Formulations 1 and 2 were prepared based on a homogenous blend of various weight percentages of Isocyanate 1, commercially available as DESMODUR® N 3300A by Bayer MaterialScience LLC, with various weight percentages of Polyol 2, commercially available as XPEP1005-1.5 by Resinate Materials Group. Formulation 1 had a % NCO of the resulting prepolymer of 8% NCO, and Formulation 2 had a % NCO of the resulting prepolymer of 12% NCO. Formulations 3 and 4 were prepared based on a homogenous blend of various weight percentages of Polyol 2 with various weight percentages of Isocyanate 2, commercially available as DESMODUR® XP 2838 by Bayer MaterialScience LLC. Formulation 3 had a % NCO of the resulting prepolymer of 8% NCO, and Formulation 4 had a % NCO of the resulting prepolymer of 12% NCO. Formulations 5 and 6 were prepared based on a homogenous blend of various weight percentages of Polyol 2 with various weight percentages of Isocyanate 3, commercially available as DESMODUR® XP 2489 by Bayer MaterialScience LLC. Formulation 5 had a % NCO of the resulting prepolymer of 8% NCO, and Formulation 6 had a % NCO of the resulting prepolymer of 12% NCO. Formulation 7 was prepared based on a homogenous blend of Polyol 2 with Isocyanate 5, commercially available as PAPI 94 by DOW®, with a resulting prepolymer having 12% NCO. Formulation 8 was prepared based on a homogenous blend of Polyol 2 with Isocyanate 2 and Isocyanate 4, commercially available as DESMODUR® W by Bayer MaterialScience LLC, with a resulting prepolymer having 8% NCO. Formulation 9 was prepared based on a homogenous blend of Isocyanate 2 with Polyol 1, commercially available as STEPANPOL® PC-5020-160 by Stepan, with a prepolymer of 8% NCO. Formulation 10 was prepared based on a homogenous blend of Isocyanate 3 with Polyol 1, with the resulting prepolymer having 8% NCO. Formulation 11 was prepared based on a homogenous blend of Isocyanate 2 with Polyol 3, commercially available as XPEP1005-2.5 by Resinate Materials Group, with a resulting prepolymer having 8% NCO. Formulation 12 was prepared based on a homogenous blend of Isocyanate 4 with Polyol 2, with a resulting prepolymer having 8% NCO.

Referring to Table 2, Formulations 13-27 were formed with various weight percentages of isocyanates and fillers, with all of Formulations 13-27 being formed of Polyol 2. Specifically, Formulations 13 and 14 were prepared based on a homogenous blend of various weight percentages of Isocyanate 2 with various weight percentages of chopped carbon fiber as the filler, with resulting prepolymers having 8 and 10% NCO, respectively. Formulation 15 was prepared based on a homogenous blend of Isocyanate 2 with EPOCYL™ 128-02, which is commercially available by Nanocyl and is based on a liquid bisphenol-a (bis-a) epoxy resin containing a high concentration of carbon nanotubes, with a resulting prepolymer having 10% NCO. Formulations 16 and 17 were prepared based on a homogenous blend of various weight percentages of Isocyanate 2 with various weight percentages of fumed silica as the filler, with resulting prepolymers having 11 and 11.5% NCO. Formulation 18 was prepared based on a homogenous blend of Isocyanate 2 with DRAGONITE-XR™, commercially available from Applied Minerals Inc., as the filler, with a resulting prepolymer having 10% NCO. Formulation 19 was prepared based on a homogenous blend of Isocyanate 2 with NANOMER® 1.28E, which is a clay-based filler commercially available from Nanocor, Inc., with a resulting prepolymer having 10% NCO. Formulation 20 was prepared based on a homogenous blend of Isocyanate 2 with chopped glass fiber as the filler, with a resulting prepolymer having 10% NCO. Formulation 21 was prepared based on a homogenous blend of Isocyanate 1 with chopped glass fiber as the filler, with a resulting prepolymer having 10% NCO. Formulation 22 was prepared based on a homogenous blend of Isocyanate 1 with boron nitride as the filler, with a resulting prepolymer having 10% NCO. Formulations 23 and 24 were prepared based on a homogenous blend of various weight percentages of Isocyanate 1 with various weight percentages of NYGLOS® 4W, a wollastonite-based filler commercially available by Nyco, with resulting prepolymers having 10 and 9.5% NCO, respectively. Formulation 25 was prepared based on a homogenous blend of Isocyanate 1 with W-610 as the filler, which is ceramic microspheres commercially available by 3M®, with a resulting prepolymer having 10% NCO. Formulation 26 was prepared based on a homogenous blend of Isocyanate 1 with NYGLOS® 4W and W-610 as the fillers, with a resulting prepolymer having 10% NCO. Formulation 27 was prepared based on a homogenous blend of Isocyanate 4 with NYGLOS® 4W as the filler, with a resulting prepolymer having 10% NCO.

The homogenous blends of reagents of the above formulations were then impregnated into the above-described carbon fiber fabric using a hand layup method. A PET film (e.g., backing film 118a) was applied to the resulting prepreg, which was then rolled on to a core, such as a polyvinyl chloride (PVC) core, to form a prepreg roll. The prepreg roll was then vacuum packed and allowed to partially cure to completion in an oven at 55° C. overnight.

The next day, the partially cured prepregs were removed from the vacuum packed pouches, and the intermediary PET film was removed. Panels that were 11 mils thick were prepared, stacking four layers of the prepreg on top of each other. Water was sprayed on to each layer as each layer was applied on top of the previous layer. The prepregs were allowed to moisture cure for a week in a pneumatic press between two metal plates. Metal shims 11 mils thick were placed between the two metal plates to maintain a constant gap.

After a week of curing, rectangles were cut from the fully cured composite reinforcement panels using a wet saw. The rectangles were six inches long by one inch wide. The rectangles were cut such that the principal direction of the carbon fibers was orthogonal to the principal direction of the rectangles. The rectangles were wiped clean to remove excess water and allowed to dry in ambient conditions overnight.

Controls were separately made to compare performance. The first control was made with a hand layup of the same carrier as above, i.e., Titan™-118 carbon fiber uni-directional fabric, with commercially available isocyanate prepolymers used in making prepregs. Specifically, the commercially available isocyanate prepolymers are based on the above-described "aliphatic" resin having a 5.2% isocyanate prepolymer that is based on dicyclohexylmethane-4,4'-diisocyanate. The commercially available prepolymer (also referred to herein as E1) was conventionally applied to the carrier in that the prepolymer was applied directly to the carrier instead of applying a homogenous blend of reagents used to form the prepolymer to the carrier during the impregnation process.

The second control was an epoxy-based composite reinforcement system using the same carrier Titan™-118 carbon fiber uni-directional fabric. More specifically, the epoxy-based composite reinforcement system used was Neptune Research Inc.'s commercially available Titan™ 118 structural system based on the Titan-Saturant Epoxy with the same carrier as described above.

Figure 5A:
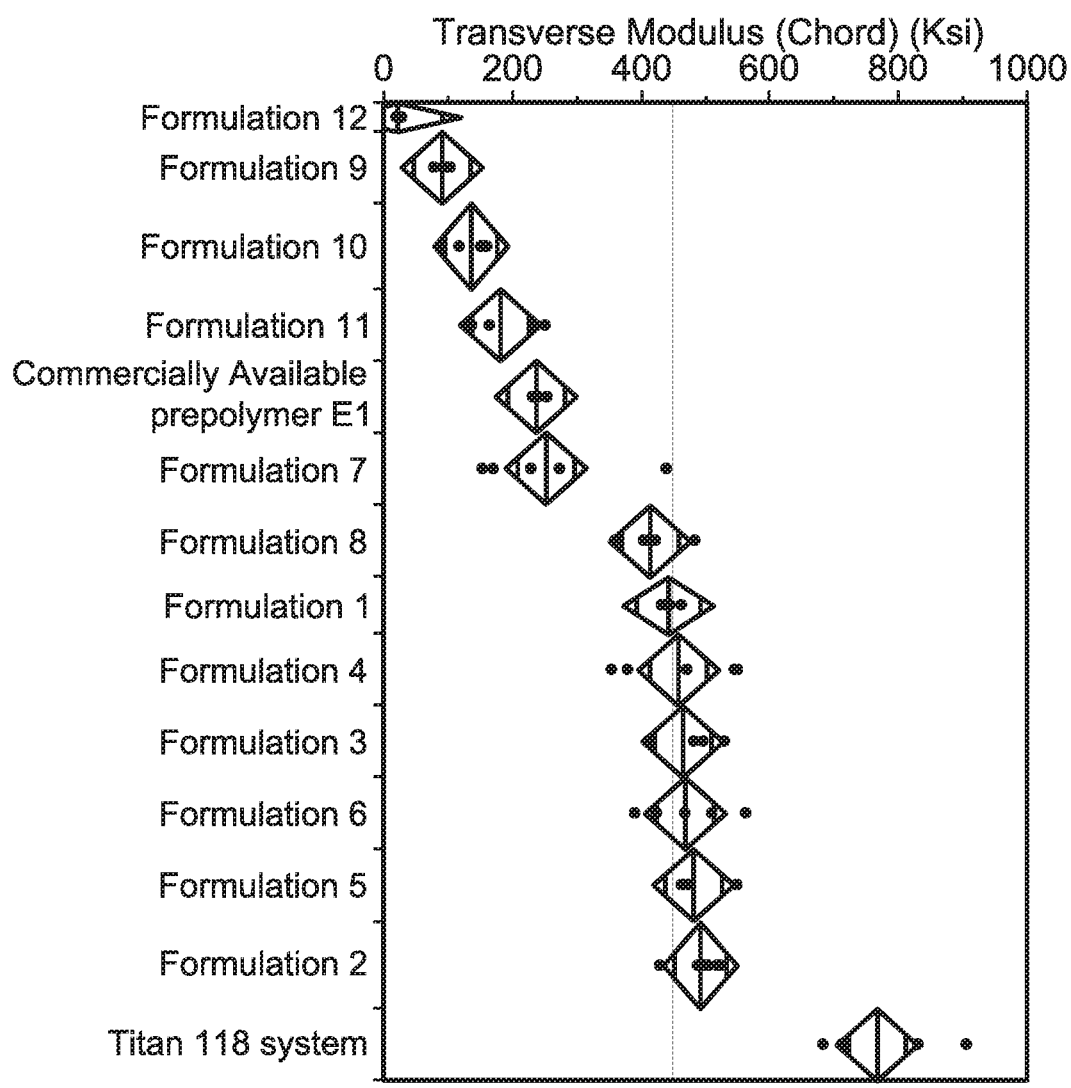
FIG. 5A shows a plot comparing the traverse modulus of composite reinforcement systems prepared using various formulations of a resinous material, in accord with aspects of the present disclosure.
Figure 5B:
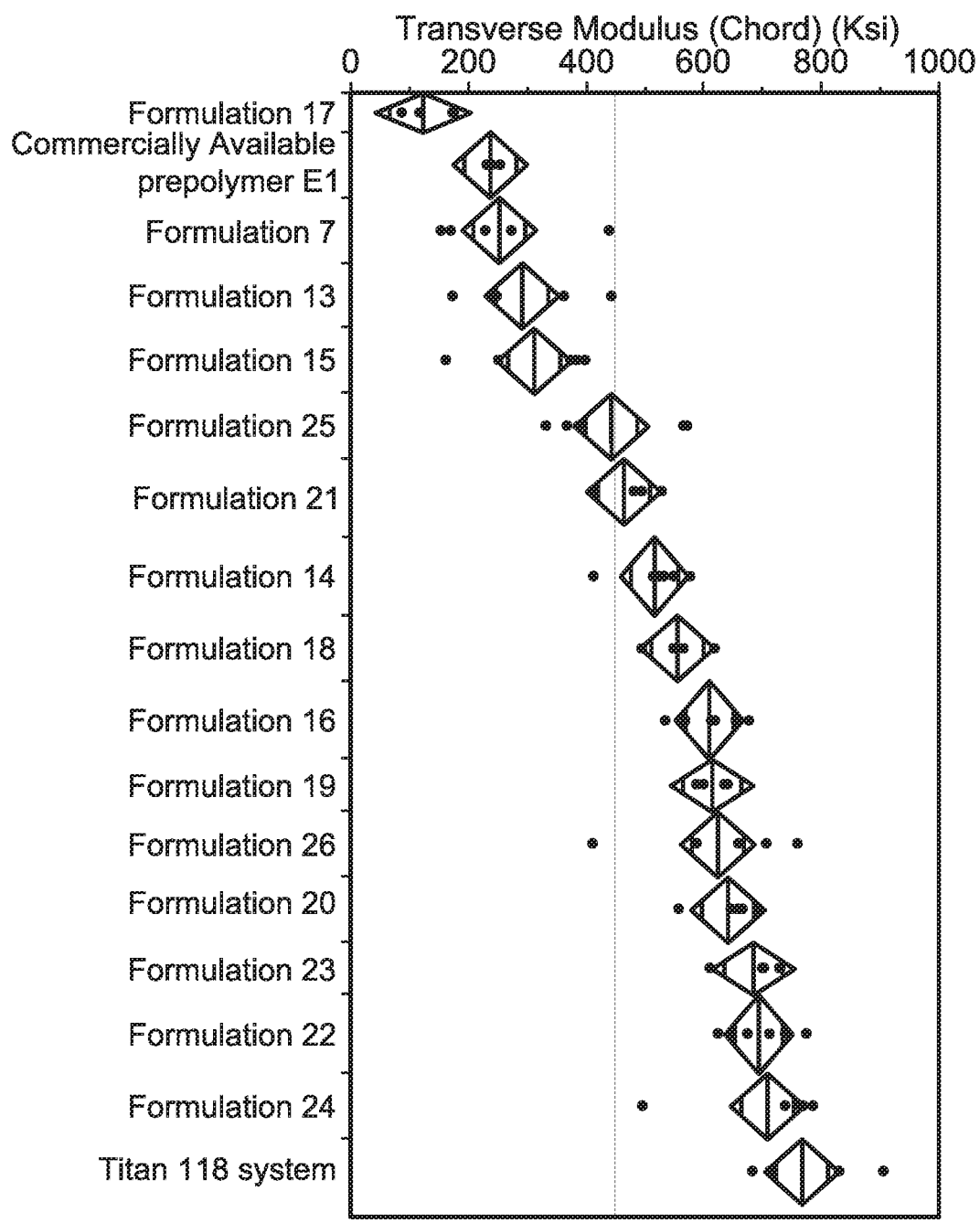
FIG. 5B shows a plot comparing the traverse modulus of composite reinforcement systems prepared using various formulations of a resinous material, in addition to fillers, in accord with aspects of the present disclosure.

FIGS. 5A and 5B show transverse modulus data of the above formulations shown in Tables 1 and 2, respectively. The transverse modulus was tested in an ADMET tensile machine. As seen, apart from the formulations 9-12 and 17, all formulations made according to method described above with respect to FIG. 1A in terms of impregnation of a homogenous blend of reagents in the carrier, and according to the chemistry disclosed herein, result in prepolymers and fully cured resins that have superior performance compared to the control E1 composite reinforcement system. In many of the formulations, the transverse moduli of the composite reinforcement systems made according to the concepts of the present disclosure are significantly better than the control E1 composite reinforcement system. Moreover, the transverse moduli of the composite reinforcement systems made according to the concepts of the present disclosure are comparable to the epoxy-based composite reinforcement system.

As described above, Formulations 9 and 10 were formed using Polyol 1, which is an aromatic polyester polyol but not a PET polyester-based aromatic-group-containing polyol. From a comparison of Formulations 9 and 10 to formulations that used a PET-based polyol, such as Formulations 1-8, it can be seen that the non-PET-based polyols performed worse than PET-based polyols. However, the performance of Formulations 9 and 10 can still be adequate for certain reinforcement applications.

Formulation 11 was formed using Polyol 3, which is a PET-based polyol. However, Polyol 3 includes a higher equivalent weight than Polyol 2. Nevertheless, the performance of Polyol 3 is still better than performance of Polyol 1 in Formulations 9 and 10, which is not a PET-based polyol. Further, the performance of Formulation 11 can still be adequate for certain reinforcement applications. Moreover, even though, for example, the mean performance of Polyol 3 in Formulation 11 may be slightly less than the mean performance of the commercially available prepolymer E1, they are statistically not significantly different.

Moreover, with most, if not all, of the formulations listed in Tables 1 and 2, impregnation of the carrier would be severely limited, if not impossible, without impregnating the carrier with a mixture of the reagents that react to form the prepolymer, as discussed above with respect to the process of FIG. 1A, instead of the prepolymer directly because of the viscosity of the resulting prepolymers. Accordingly, the prepolymers resulting from the formulations discussed above are now available as a prepolymer for impregnation of a carrier for a composite reinforcement system.

Additionally, the modulus of Formulation 23 was measured in the direction of the principal axis of carbon fibers (as opposed to transverse modulus). This modulus was compared with the moduli in the principal axis of the carbon fibers for the epoxy-based composite reinforcement systems and with the control E1 composite reinforcement system.

Figure 6:
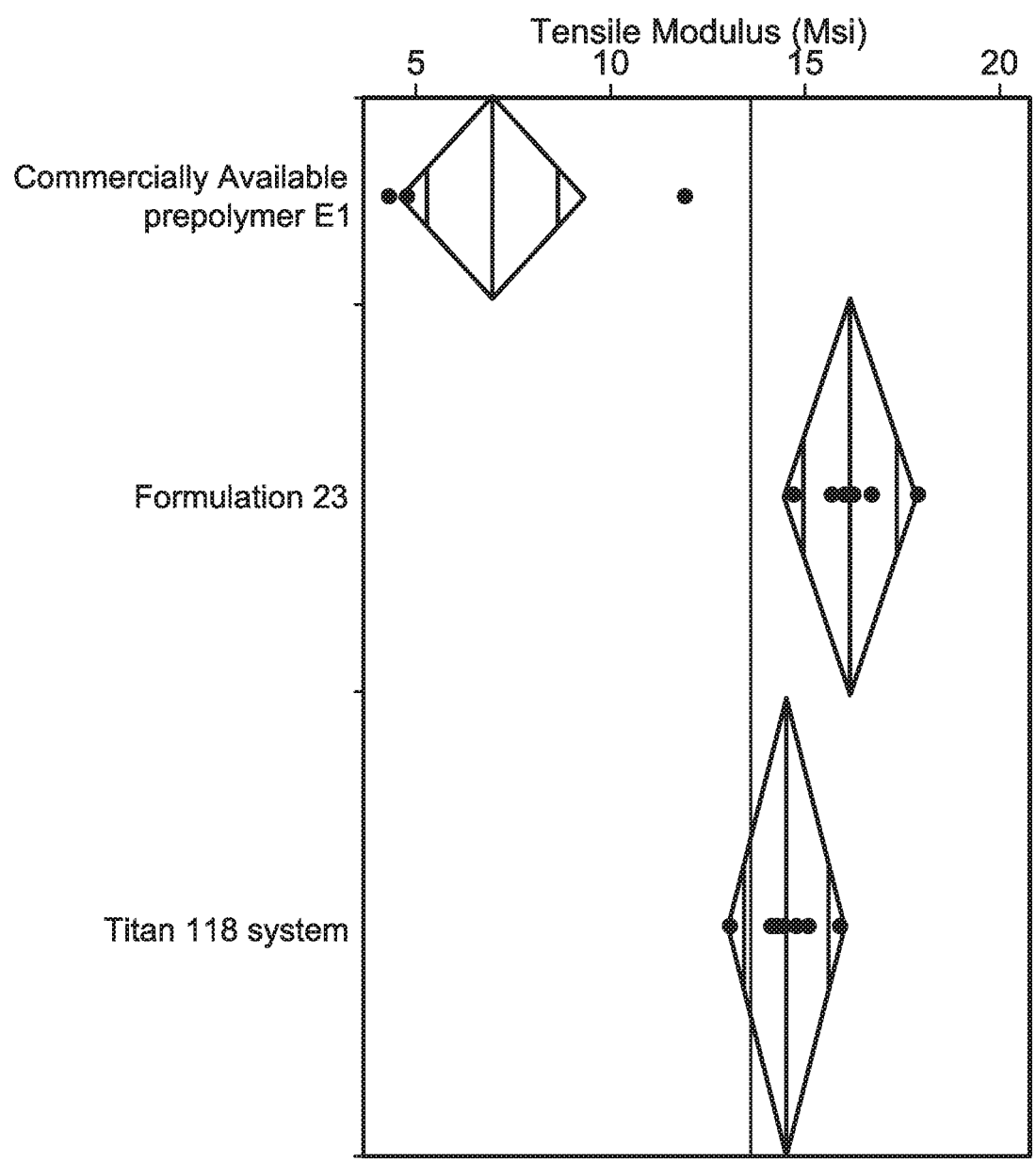
FIG. 6 shows a plot comparing the tensile modulus of composite reinforcement systems prepared using various formulations of a resinous material, in accord with aspects of the present disclosure.

FIG. 6 shows the tensile modulus in the principal axis of the fibers from the resulting data. As shown, Formulation 23 is superior in tensile modulus to both the epoxy-based composite reinforcement system and to the control E1 composite reinforcement system.

Thus, based on the data shown in Tables 1 and 2 and FIGS. 5A, 5B, and 6, a benefit of a composite reinforcement system using an aliphatic isocyanate-functionalized prepolymer, particularly one formed from a polyfunctional isocyanate, such as an isocyanurate-based polyfunctional aliphatic isocyanate, and a PET polyester-based aromatic-group-containing polyol, is a high-stiffness and high-strength composite reinforcement system. Thus, moisture-curable prepolymers formed from a mixture of, for example, about 60 to 82 wt % of an isocyanate, such as an isocyanurate-based polyfunctional aliphatic isocyanates, and about 18 to 40 wt % of a polyol containing an aromatic group within its backbone form a prepolymer resulting in a fully cured composite reinforcement system that approaches the strength of epoxy-based composite reinforcement systems, with specific examples of, for example, Formulations 2, 5, and 6 discussed above exhibiting particularly beneficial results. The addition of other additives, such as non-reactive fillers, to the mixture of reagents allows for similar if not better performance, while reducing the amounts of the reagents. Moisture-curable prepolymers formed from a mixture of, for example, about 54 to 80 wt % of an isocyanate, such as an isocyanurate-based polyfunctional aliphatic isocyanates, and about 12 to 27 wt % of a polyol containing an aromatic group within its backbone, with one or more fillers accounting for, for example, about 8 to 33 wt %, also form a prepolymer resulting in a fully cured composite reinforcement system that approaches if not exceeds the strength of epoxy-based composite reinforcement systems, with specific examples of, for example, Formulations 20 and 22-24 discussed above exhibiting particularly beneficial results. However, based on prepregs of the disclosed composite reinforcement systems being pre-packaged as part of a kit, with a partially cured prepolymer providing a flexible and partially cured prepreg, the composite reinforcement systems of the present disclosure can be easier to apply in the field while providing the same structural reinforcement benefits.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the invention. It is also contemplated that additional embodiments according to aspects of the present invention may combine any number of features from any of the embodiments described herein.

What is claimed is:

1. A composite reinforcement system comprising:
a carrier made of a plurality of fibers; and
a moisture-curable prepolymer impregnating the carrier in a partially cured state, the moisture-curable prepolymer formed of at least a polyfunctional aliphatic isocyanate and an aromatic-group-containing polyol as the only polyol;
wherein the polyfunctional aliphatic isocyanate is an isocyanurate-based polyfunctional isocyanate with an isocyanate functionality of greater than two,
the carrier is a fabric or includes unidirectional fiber layers therein,
the aromatic-group-containing polyol is based on a polymer selected from polyester, polyamide, polyurethane, polyurea, and a combination thereof and has aromatic groups in its backbone,
wherein the polyfunctional aliphatic isocyanate includes about 50 wt. % to 90 wt. % of the moisture-curable prepolymer, and the aromatic-group-containing polyol constitutes about 10 wt. % to 50 wt. % of the moisture-curable prepolymer, and
wherein the composite reinforcement system is packed in a moisture-tight enclosure.

2. The composite reinforcing system of claim 1, further comprising a filler in the moisture-curable prepolymer, the filler selected from the group consisting of wollastonite, halloysite, chopped glass, boron nitride, boron carbide, silicon carbide, tungsten carbide, aluminum oxide, fumed silica, chopped carbon fiber, and a combination thereof.

3. The composite reinforcing system of claim 1, wherein a ratio of the carrier to the moisture-curable prepolymer between about 40:60 to about 60:40 by weight.

4. The composite reinforcing system of claim 1, wherein the aromatic-group-containing polyol is polyester-based and includes aromatic groups in its backbone allowing for pi-pi stacking.

5. The composite reinforcement system of claim 1, wherein the plurality of fibers are selected from carbon fibers, glass fibers, basalt fibers, liquid crystalline polyester fibers, aramid fibers, metal fibers, and a combination thereof.

6. The composite reinforcing system of claim 1, wherein the plurality of fibers include carbon fibers extending in a 0 degree direction and fiberglass fibers in a 90 degree direction, and the carbon fibers constitute at least about 70 wt % of the carrier and the fiberglass fibers constitute at most about 30 wt % of the carrier.

7. A method of making the composite reinforcing system of claim 1, comprising forming a prepreg for the composite reinforcement system, wherein the forming the prepreg comprises:
forming a blend of at least two reagents chemically configured to react to form the moisture-curable prepolymer;
impregnating the carrier with the blend of the at least two reagents; and
while within the carrier, allowing the at least two reagents impregnated within the carrier to react to form the moisture-curable prepolymer.

8. The method of claim 7, further comprising:
applying a film on one side of the prepreg;
rolling the prepreg around a core to form a prepreg roll, with adjacent layers of the prepreg within the prepreg roll being separated by the film; and
packaging the prepreg roll in a moisture-tight container.

9. A method of using the composite reinforcing system of claim 1 for reinforcing a surface, comprising:
removing the composite reinforcement system from a protective packaging;
applying the composite reinforcing system to the surface; and
allowing the moisture-curable prepolymer to cure and harden upon exposure to moisture.

10. A composite reinforcement system comprising:
a carrier and a resin, the carrier saturated with the resin, the resin including a prepolymer formed of at least a polyfunctional aliphatic isocyanate and an aromatic-group-containing polyol as the only polyol and being chemically configured to harden upon exposure to moisture,
wherein the polyfunctional aliphatic isocyanate is an isocyanurate-based polyfunctional isocyanate with an isocyanate functionality of greater than two,
the carrier is a fabric or includes unidirectional fiber layers therein, and
the aromatic-group-containing polyol is based on a polymer selected from polyester, polyamide, polyurethane, polyurea, and a combination thereof and has aromatic groups in its backbone,
wherein the polyfunctional aliphatic isocyanate constitutes about 50 wt. % to 90 wt. % of the moisture-curable prepolymer, and the aromatic-group-containing polyol constitutes about 10 wt. % to 50 wt. % of the moisture-curable prepolymer, and
wherein the composite reinforcement system is stored in a moisture-tight enclosure.

11. The composite reinforcement system of claim 10, wherein the plurality of fibers comprises carbon fibers, glass fibers, and a combination thereof.

12. The composite reinforcing system of claim 10, wherein a ratio of the carrier to the resin between about 40:60 to about 60:40 by weight.

13. A method of making the composite reinforcing system of claim 10, comprising forming a prepreg for the composite reinforcement system by
forming a blend of at least two reagents chemically configured to react to form the prepolymer; and
impregnating the carrier with the blend of the at least two reagents.

14. A method of using the composite reinforcing system of claim 10 for reinforcing a surface of a physical structure, comprising:
- applying the composite reinforcing system to the surface; and
- allowing the prepolymer to cure and harden upon exposure to moisture.

15. The method of claim 14, wherein the physical structure is selected from the group consisting of a pipe, a tank, a concrete beam, a concrete slab, a concrete column, a concrete square, a metal structure, a wall, and a floor slab.

16. The method of claim 14, wherein the physical structure is a pipeline, and the composite reinforcement system is wrapped around a pipeline assembly in one or more overlapping layers.

* * * * *